United States Patent
Passler et al.

(10) Patent No.: US 11,778,581 B2
(45) Date of Patent: Oct. 3, 2023

(54) GEO-LOCATING MOVING WIRELESS DEVICES

(71) Applicant: SR Technologies, Inc., Sunrise, FL (US)

(72) Inventors: Mark Passler, Boca Raton, FL (US); Steven Romanow, Sunrise, FL (US)

(73) Assignee: SR Technologies, Inc., Sunrise, FL (US)

( * ) Notice: Subject to any disclaimer, the term of this patent is extended or adjusted under 35 U.S.C. 154(b) by 95 days.

(21) Appl. No.: 17/515,692

(22) Filed: Nov. 1, 2021

(65) Prior Publication Data

US 2022/0057500 A1    Feb. 24, 2022

Related U.S. Application Data

(60) Provisional application No. 62/110,567, filed on Feb. 1, 2015.

(51) Int. Cl.
*H04W 64/00* (2009.01)

(52) U.S. Cl.
CPC .................................. *H04W 64/00* (2013.01)

(58) Field of Classification Search
CPC ............................ G01S 13/006; G01S 13/876
See application file for complete search history.

(56) References Cited

U.S. PATENT DOCUMENTS

| | | | |
|---|---|---|---|
| 8,188,919 B2 * | 5/2012 | Grabbe | G01S 5/011 342/450 |
| 10,531,240 B1 * | 1/2020 | Sciancalepore | H04B 17/364 |
| 2012/0059621 A1 * | 3/2012 | Kotzor | G01S 5/14 702/150 |
| 2022/0377625 A1 * | 11/2022 | Li | H04W 36/0058 |

* cited by examiner

*Primary Examiner* — Muthuswamy G Manoharan
(74) *Attorney, Agent, or Firm* — Christopher & Weisberg, P.A.

(57) ABSTRACT

A method in a wireless device (WD) for determining a best-fit geo-location of a target station is described. The best-fit geo-location is determined using a plurality of round-trip times (RTTs). The target station is movable. The method includes assigning values to current target station parameters. The current target station parameters include a current location for the target station and movement parameters. A plurality of square residuals is determined based at least in part on the current target station parameters. Each square residual of the plurality of square residuals corresponds to one RTT. A minimum of a sum of squared residuals (SSR) is determined based at least on the plurality of square residuals. best-fit parameters are determined based at least in part on the determined minimum of the SSR. In addition, the best-fit geo-location of the target station is determined based at least on the best-fit parameters.

15 Claims, 10 Drawing Sheets

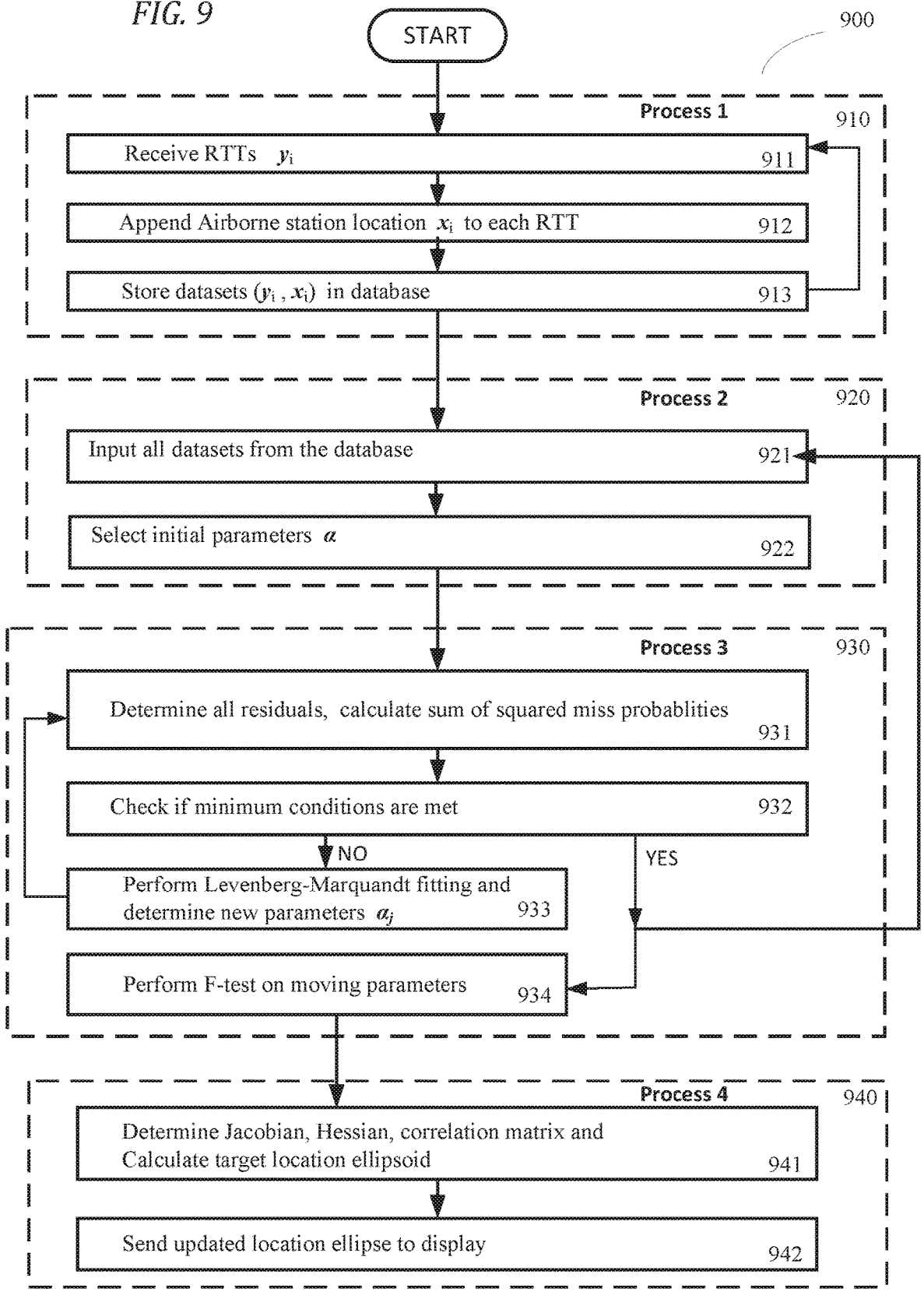

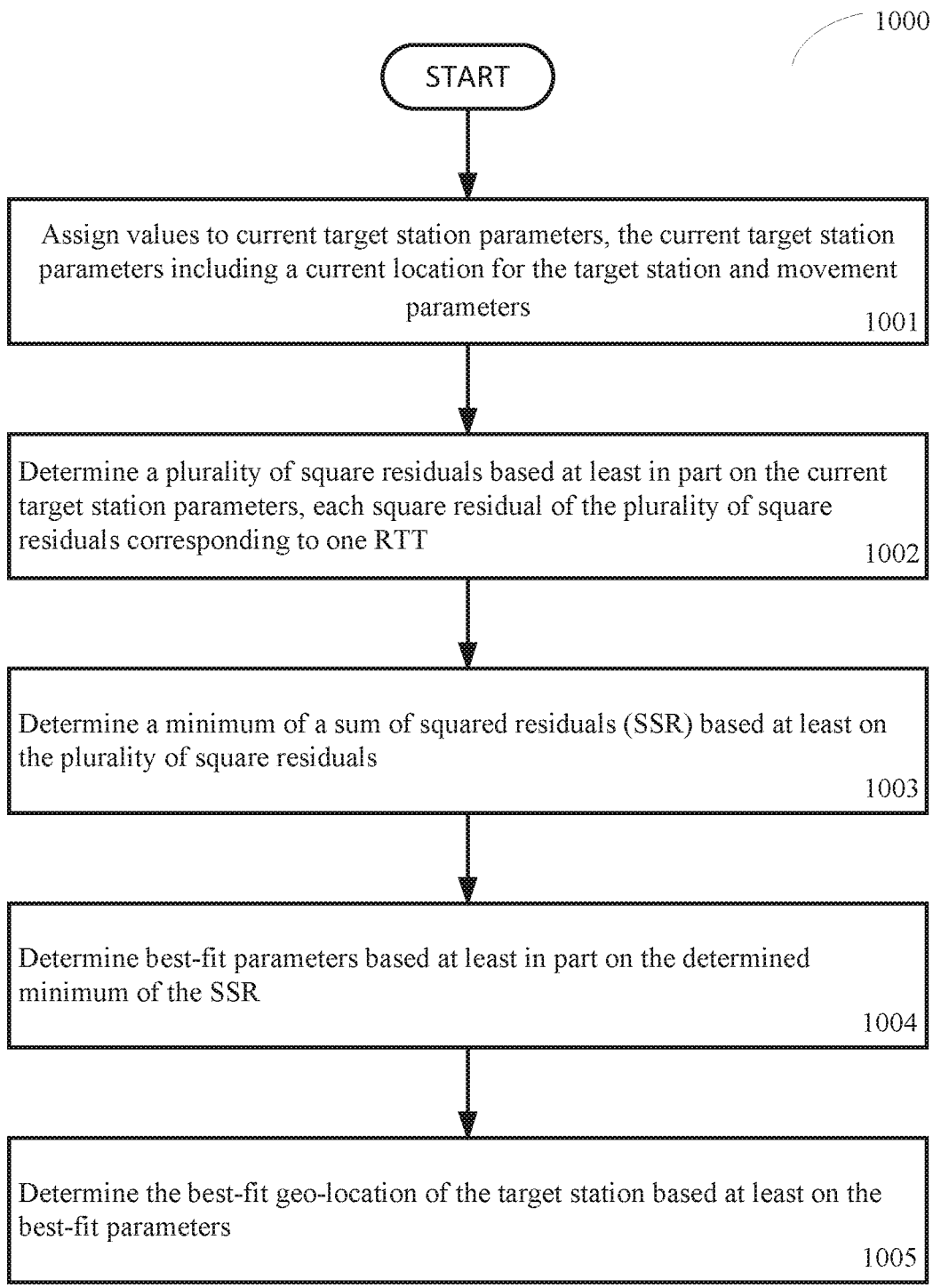

GEO-LOCATING MOVING WIRELESS DEVICES

CROSS-REFERENCE TO RELATED APPLICATION

This application is related to and claims priority to U.S. Provisional Patent Application Ser. No. 63/110,567, filed Nov. 6, 2020, entitled GEO-LOCATING MOVING WIRELESS DEVICES, the entirety of which is incorporated herein by reference.

TECHNICAL FIELD

The present disclosure relates to geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive, and combined active and passive. In an active location scheme, a device that is determining the location or range, the measuring device transmits certain packets, referred to as "ranging packets", to the device being located, i.e., the target device. A common method is to measure the time of arrival (TOA) of the response packet from the target device and compare that to the time of departure (TOD) of the ranging packet that was transmitted by the measuring device so as to determine the round trip time, RTT.

In an active location scheme, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the ranging packet transmitted from the measuring station to the target station is a data packet, the response from the target station will normally be an acknowledgement (ACK) packet. If the ranging packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, or time of flight (TOF) between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b, and 110c (referred to collectively herein as "measuring stations" or "measuring receivers" 110). The target station 120 may be a wireless device, such as, for example, an Access Point (AP) that is to be located by the three airborne measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can be used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140, and D3 150 are well known.

FIG. 2 is a diagram of a location system where a single airborne measuring station 110 is used. The airborne measuring station 110 is depicted being flown in an orbit 200 (e.g., circular orbit), centered at location E 220. Initially consider that a target station 120 is stationary at location F 230. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. The three RTT measurements taken when the airborne measuring station 110 is at positions A 201, B 202, and C 203 will yield the distances D4 210, D5 211, and D6 212, thus enabling the location F 230 to be calculated. Consider the case where the target station 120, is not stationary but moving with a constant velocity. In this example, when airborne measuring station 110 is at position B 202, target station 120 is at location G 235 and when airborne measuring station 110 is at position C 203, the target station 120 is at location H 236. In this case, the three RTTs will now correspond to distances D4 210, D15 215, and D16 216. From the RTT measurements D4 210 and D15 215, the location of the target station 120 may be calculated to be at location P 250, where the arcs 240 and 242 for D4 and D15 respectively intercept, but when the RTT measurement D16 216 is taken, there is no single point where all three arcs, 240 242 and 244, for D4, D15 and D16 respectively, intercept. The approximate location might be calculated as close to Q 252, but with a large uncertainty. Hence, if the target station 120 is not stationary, then in order to determine an accurate location the geo-calculations should account for the movement.

FIG. 3 is a timing diagram that describes a ranging transmission method of the present disclosure that may be used to determine the distance between two wireless devices: an airborne measuring station 110 and a target station 120. Time axis 365 is the time axis for the airborne measuring station 110, and time axis 367 is the time axis for the target station 120. At time Ta 311, airborne measuring station 110 starts the transmission of ranging packet 340 which is addressed to target station 120. After a time-delay of td, at time Tb 321, target station 120 starts to receive ranging packet 340. At time Tc 312, airborne measuring station 110 completes the transmission of ranging packet 340, and at time Td 322, target station 120 completes the reception of ranging packet 340. The time difference between Tc 312 and Td 322 is td 331, which is the propagation time for the packet to travel from airborne measuring station 110 to target station 120. Note that the time differences (Tc–Ta) and (Td–Tb) are both the duration tp 330 of the transmitted ranging packet 340.

Target station 120 transmits the response packet 345 at time Te 323. Assuming that the response packet 345 is an ACK or an RTS packet in reply to the received ranging packet 340, time Te 323 ideally will be at a time $t_{SIFS}$ 332 after time Td 322, where $t_{SIFS}$ 332 is the SIFS time as defined in the IEEE 802.11 standard. At time Tf 314, airborne measuring station 110 starts to receive the response packet 345. At time Tg 324, target station 120 completes the transmission of the response packet 345, and at time Th 325, airborne measuring station 110 completes receiving the response packet 345. Note that the time differences (Tb–Ta), (Td–Tc), (Tf–Te), and (Th–Tg) are all equal and have the value td 331 which is the propagation time for the packet and response to travel between the two stations.

At airborne measuring station 110, the time of a packet at the point when the frame check has completed, may be recorded. Hence, the time for the transmission of ranging packet 340 that is recorded, is Tc 312, and the time that is recorded for the reception of the response packet 345 is Th 325. In order to calculate the value of td, it is desirable to know the duration tr 334 of the response packet 345. Calculating the duration tr 334 is straightforward as the duration of the response packet 345 is defined in the Standard. In practice therefore, airborne measuring station 110 can calculate the value of td from expression (3):

$$td = (Th - Tc - tr - t_{SIFS})/2 \qquad (2)$$

$$\text{and hence the corresponding distance, } D = td*c \qquad (3)$$

Stated another way, airborne measuring station 110 begins transmission of ranging packet 340 at a beginning transmission time Ta 311 and ends transmission of the ranging packet 340 at an ending transmission time Tc 312. Target station 120 receives the first ranging packet 340 at time Td 322 and starts to transmit the response packet at time Te 323. The airborne measuring station 110 receives the complete response packet 345 at an ending reception time Th 314, wherein td 331 is measured as the time (Th 325–Tc 312–tr 334–$t_{SIFS}$ 332)/2.

A reception window Trw 360 may be defined which may be related to the range of the target station 120. The reception window starts at time Ts 310 after the end of the transmission Tc 312 of ranging packet 340 and ends at time Tt 320 after the end of the transmission Tc 312 of ranging packet 340. As an example, the reception window Trw may be set to start at time Ts 310, 10 μs after time Tc 312, and end at time Tt 320, 60 μs after time Tc 312. In this example the duration of the reception window Trw 360 is 50 μs. Airborne measuring station 110 may transmit ranging packets 340 at time intervals of Tp 350.

Hence, with reference again to FIG. 2, in the general sense, as the airborne measuring station 110 flies around the target station 120 transmitting ranging packets either continuously spaced at Tp 350 or in bursts of N transmissions, each transmission within the burst being spaced at Tp 350. Airborne measuring station 110 will be measuring (i.e., measures, may measure, etc.) the RTT corresponding to its own location (e.g., latitude, longitude, altitude). Based upon a set of measured RTTs and corresponding airborne measuring station 110 locations, and with knowledge of the ground elevation of the target station 120, the airborne measuring station 110 can estimate the distance to the target station 120 using equations (2) and (3).

RTT measurements, in the general sense, will exhibit variations due to noise, in the case of weak signal strengths, and, in part, the timing accuracy of the clock at the target station 120 and the timing accuracy of the clock at the airborne measuring station 110. In addition, it should be known that many Wi-Fi devices do not use the correct SIFS as per the IEEE 802.11 standard. Therefore, in order to derive an estimated position for the target station 120, the determination of a best fit to the RTT measurements is required. The fitting of models to data when the equations are non-linear is a well-developed discipline and the classical method for fitting RTT measurements to a target position is by use of minimization of the summation of the squared residuals (SSR), a known technique.

It should be known that in the case of very weak signal levels, and when correlation methods may be in use for the detection of the response packet 345, it is possible to falsely detect a response packet. In the presence of such spurious RTT measurements, the use of the SSR technique to determine a best fit can produce errors in the estimated position of the target station 120.

As discussed above with reference to FIG. 2, if the target station 120 is not stationary, in order to derive an estimated position for the target station 120 and to determine a best fit to the RTT measurements, a further set of variables related to movement are required.

SUMMARY

Some embodiments advantageously provide methods, systems, and apparatuses for geo-locating moving wireless devices.

In one aspect of the present disclosure, a method for determining a best-fit geo location of a target station is described. The method is implemented in a wireless device (WD), e.g., a measuring system, measuring station. The best-fit geo-location of the target station is determined using a plurality of round-trip times (RTTs), where each RTT is a time elapsed between a transmission of a ranging packet by the WD and a reception of a response packet by the WD. The target station is movable. The method includes assigning values to current target station parameters. The current target station parameters include a current location for the target station 120 and movement parameters. A plurality of square residuals is determined based at least in part on the current target station parameters. Each square residual of the plurality of square residuals corresponds to one RTT. A minimum of a sum of squared residuals (SSR) is determined based at least on the plurality of square residuals. Best-fit parameters are determined based at least in part on the determined minimum of the SSR. The best-fit geo-location of the target station is determined based at least on the best-fit parameters.

In some embodiments, determining the plurality of square residuals further includes determining a first group of residuals based on stationary parameters and a second group of residuals based on the movement parameters, and for each of the first group and the second group of residuals: determining a model fit probability based at least in part on one of the determined first group of residuals and the determined second group of residuals; determining the SSR; performing non-linear fitting based at least on the calculated SSR; determining new parameters based at least on the non-linear fitting; and determining new residuals based at least in part on the determined new parameters.

In some other embodiments, performing non-linear fitting and determining new parameters are further based on a Levenberg-Marquardt process.

In an embodiment, the method further includes performing an F-test to determine whether the non-linear fitting corresponding to the moving parameters is a better fit than the non-linear fitting corresponding to the stationary parameters. If the non-linear fitting corresponding to the moving parameters is the better fit, the non-linear fitting corresponding to the moving parameters is used to determine the best-fit geo-location. If the non-linear fitting corresponding to the moving parameters is not the better fit and one of a first condition is met and a second condition is met, the non-linear fitting corresponding to the stationary parameters to is used to determine the best-fit geo-location. The first condition is met when a first difference between an SSR and a subsequent SSR is less than a predetermined minimum. The second condition is met when an absolute value of a second difference between a target station parameter and a subsequent target station parameter is less than the predetermined minimum.

In another embodiment, the first group of residuals is defined by:

$$f(x_i, \alpha) = \alpha^{OFF} + \left(\frac{2}{c}\right) * d(x_i, \alpha).$$

Where $d(x_i, \alpha) =$ $$\left[(x_i^{LAT} - \alpha^{LAT})^2 + ((x_i^{LON} - \alpha^{LON}) * \cos(x_i^{LAT}))^2 + \left(\frac{x_i^{ALT} - \alpha^{ALT}}{CONVERSION}\right)^2\right]^{\frac{1}{2}};$$

the second group of residuals is defined by:

$$f(x_i, \alpha) = \alpha^{OFF} + \left(\frac{2}{c}\right) * d(x_i, \alpha),$$

Where $d(x_i, \alpha) = \Big[(x_i^{LAT} - (\alpha^{LAT} + \alpha^{VelNorth} * x_i^{TD}))^2 +$ $$((x_i^{LON} - (\alpha^{Lon} + \alpha^{VelEast} * x_i^{TD})) * \cos(x_i^{LAT}))^2 + \left(\frac{x_i^{ALT} - \alpha^{ALT}}{CONVERSION}\right)^2\Big]^{\frac{1}{2}},$$

$x_i$ represents WD location parameters, $\alpha$ represents location parameters of the target station, $x_i^{TD}$ is a negative time span of the corresponding RTT and a current time, $\alpha^{VelEast}$ is in degrees latitude per time and is converted to a spherical coordinate by multiplying by $\cos(x_i^{LAT})$ before converting units, and CONVERSION refers to conversion of altitude units to geographic distance units, speed of light being in units of geographic distance divided by units of RTT.

In some embodiments, the target station is moving, and the movement parameters include a first velocity vector in a first direction and a second velocity vector in a second direction.

In some other embodiments, the method further includes measuring the plurality of RTTs; appending WD location parameters to each RTT of the plurality of RTTs, where the WD location parameters are associated with a location of the WD at a time of the reception of the response packet and are determined based in part on Global Positioning System (GPS) information; storing appended WD location parameters as records in a database; and when a preset period of time has elapsed and a number of stored records in a dataset exceeds a predetermined number, retrieving the stored records from the database to determine the plurality of square residuals.

In an embodiment, the method further includes determining a target location ellipse for the target station based on the determined best-fit parameters and performing the determination of the best-fit geo location of the target station further based on the determined target location ellipse.

In another embodiment, the method further includes determining at least one of a Jacobian matrix, a Hessian sum, and a correlation matrix to determine the target location ellipse.

According to another aspect, a wireless device (WD) for determining a geo-location of a target station is described. The geo-location is determined using round-trip times (RTTs) of a plurality of signals transmitted by the WD to the target station, and response signals received from the target station corresponding to the transmitted signals. The WD includes processing circuitry configured to assign values to current target station parameters, where the current target station parameters include a current location for the target station and movement parameters; determine a plurality of square residuals based at least in part on the current target station parameters, where each square residual of the plurality of square residuals corresponding to one RTT; determine a minimum of a sum of squared residuals (SSR) based at least on the plurality of square residuals; determine best-fit parameters based at least in part on the determined minimum of the SSR; and determine the best-fit geo-location of the target station based at least on the best-fit parameters.

In some embodiments, determining the plurality of square residuals further includes determining a first group of residuals based on stationary parameters and a second group of residuals based on the movement parameters, and for each of the first group and the second group of residuals: determining a model fit probability based at least in part on one of the determined first group of residuals and the determined second group of residuals; determining the SSR; performing non-linear fitting based at least on the calculated SSR; determining new parameters based at least on the non-linear fitting; and determining new residuals based at least in part on the determined new parameters.

In some other embodiments, performing non-linear fitting and determining new parameters are further based on a Levenberg-Marquardt process.

In an embodiment, the processing circuitry is further configured to perform an F-test to determine whether the non-linear fitting corresponding to the moving parameters is a better fit than the non-linear fitting corresponding to the stationary parameters. If the non-linear fitting corresponding to the moving parameters is the better fit, the non-linear fitting corresponding to the moving parameters is used to determine the best-fit geo-location. If the non-linear fitting corresponding to the moving parameters is not the better fit and one of a first condition is met and a second condition is met, the non-linear fitting corresponding to the stationary parameters to is used to determine the best-fit geo-location. The first condition is met when a first difference between an SSR and a subsequent SSR is less than a predetermined minimum. The second condition is met when an absolute value of a second difference between a target station parameter and a subsequent target station parameter is less than the predetermined minimum.

In another embodiment, the first group of residuals is defined by:

$$f(x_i, \alpha) = \alpha^{OFF} + \left(\frac{2}{c}\right) * d(x_i, \alpha).$$

Where $d(x_i, \alpha) = \left[ (x_i^{LAT} - \alpha^{LAT})^2 + ((x_i^{LON} - \alpha^{LON}) * \cos(x_i^{LAT}))^2 + \left(\frac{x_i^{ALT} - \alpha^{ALT}}{CONVERSION}\right)^2 \right]^{\frac{1}{2}};$ and
the second group of residuals is defined by:

$$f(x_i, \alpha) = \alpha^{OFF} + \left(\frac{2}{c}\right) * d(x_i, \alpha),$$

Where $d(x_i, \alpha) = \left[ (x_i^{LAT} - (\alpha^{LAT} + \alpha^{VelNorth} * x_i^{TD}))^2 + ((x_i^{LON} - (\alpha^{Lon} + \alpha^{VelEast} * x_i^{TD})) * \cos(x_i^{LAT}))^2 + \left(\frac{x_i^{ALT} - \alpha^{ALT}}{CONVERSION}\right)^2 \right]^{\frac{1}{2}},$ $x_i$ represents WD location parameters,
α represents location parameters of the target station,
$x_i^{TD}$ is a negative time span of the corresponding RTT and a current time,
$a^{VelEast}$ is in degrees latitude per time and is converted to a spherical coordinate by multiplying by $\cos(x_i^{LAT})$ before converting units, and
CONVERSION refers to conversion of altitude units to geographic distance units, speed of light being in units of geographic distance divided by units of RTT.

In some embodiments, the target station is moving, and the movement parameters include a first velocity vector in a first direction and a second velocity vector in a second direction.

In some other embodiments, the WD further includes a transmitter receiver in communication with the processing circuitry, where the transmitter receiver is configured to measure the plurality of RTTs. The processing circuitry is further configured to append WD location parameters to each RTT of the plurality of RTTs, where the WD location parameters are associated with a location of the WD at a time of the reception of the response packet and are determined based in part on Global Positioning System (GPS) information; store appended WD location parameters as records in a database; and when a preset period of time has elapsed and a number of stored records in a dataset exceeds a predetermined number, retrieve the stored records from the database to determine the plurality of square residuals.

In an embodiment, the processing circuitry is further configured to determine a target location ellipse for the target station based on the determined best-fit parameters; and perform the determination of the best-fit geo location of the target station further based on the determined target location ellipse.

In some embodiments, the processing circuitry is further configured to determine at least one of a Jacobian matrix, a Hessian sum, and a correlation matrix to determine the target location ellipse.

According to another aspect, a measuring station for determining a best-fit geo-location of a target station is described. The best-fit geo-location is determined using a plurality of round-trip times (RTTs), where each RTT is a time elapsed between a transmission of a ranging packet by the measuring station and a reception of a response packet by the measuring station. The measuring station includes a wireless device including a transmitter receiver configured to measure the plurality of RTTs; and processing circuitry in communication with the transmitter receiver. The processing circuitry is configured to assign values to current target station parameters, where the current target station parameters including a current location for the target station and movement parameters; determine a plurality of square residuals based at least in part on the current target station parameters, where each square residual of the plurality of square residuals corresponds to one RTT. Determining the plurality of square residuals includes determining a first group of residuals based on stationary parameters and a second group of residuals based on the movement parameters; for each of the first group and the second group of residuals: determining a model fit probability based at least in part on one of the determined first group of residuals and the determined second group of residuals; determining the SSR; performing non-linear fitting based at least on the calculated SSR; determining new parameters based at least on the non-linear fitting; and determining new residuals based at least in part on the determined new parameters. The processing circuitry is further configured to determine a minimum of a sum of squared residuals (SSR) based at least on the plurality of square residuals; determine best-fit parameters based at least in part on the determined minimum of the SSR; and determine the best-fit geo-location of the target station based at least on the best-fit parameters.

In some embodiments, the processing circuitry is further configured to perform an F-test to determine whether the non-linear fitting corresponding to the moving parameters is a better fit than the non-linear fitting corresponding to the stationary parameters; if the non-linear fitting corresponding to the moving parameters is the better fit, use the non-linear fitting corresponding to the moving parameters to determine the best-fit geo-location; and, if the non-linear fitting corresponding to the moving parameters is not the better fit and one of a first condition is met and a second condition is met, use the non-linear fitting corresponding to the stationary parameters to determine the best-fit geo-location. The first condition is met when a first difference between an SSR and a subsequent SSR is less than a predetermined minimum. The second condition is met when an absolute value of a second difference between a target station parameter and a subsequent target station parameter is less than the predetermined minimum.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 9 is a flow diagram of an example process for determining the geo-location of a target station that moves at a constant velocity according to some embodiments of the present disclosure; and FIG. 10 is a flow diagram of an example process for determining a best-fit geo location of a target station according to some embodiments of the present disclosure.

DETAILED DESCRIPTION

A method and devices are disclosed that determine the geo-location of a moving target station.

Figure 1:
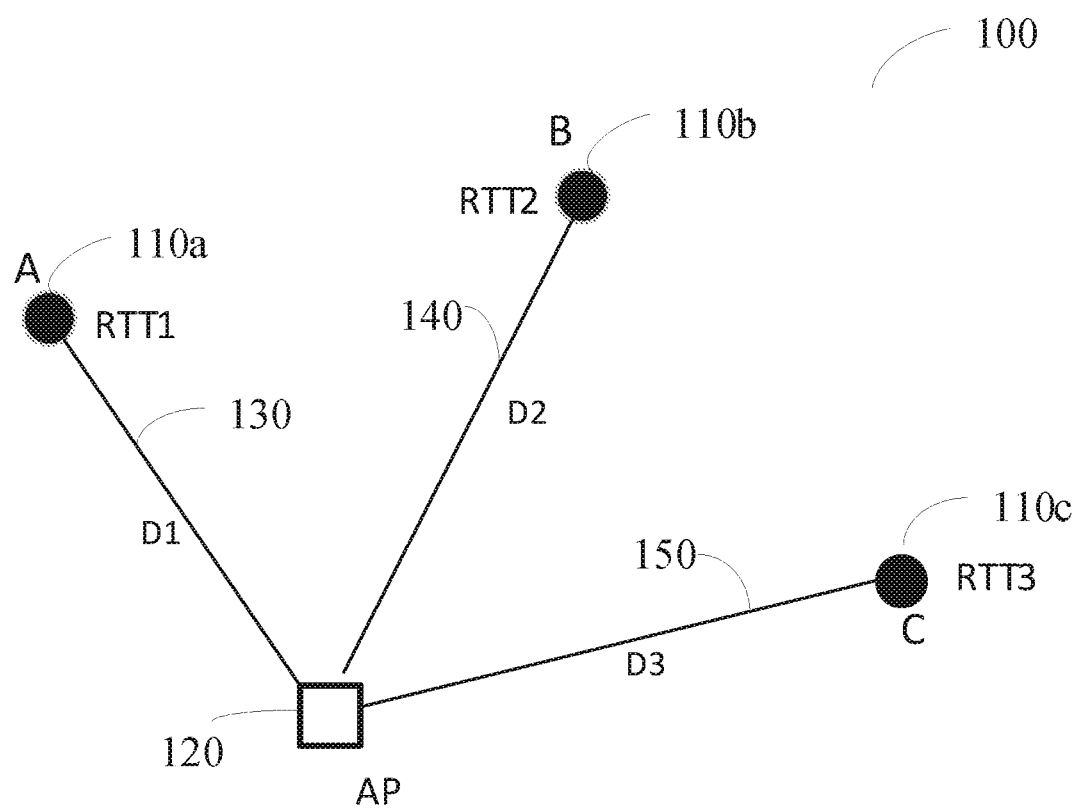
FIG. 1 is a diagram of a typical location system which includes three measuring stations.
Figure 2:
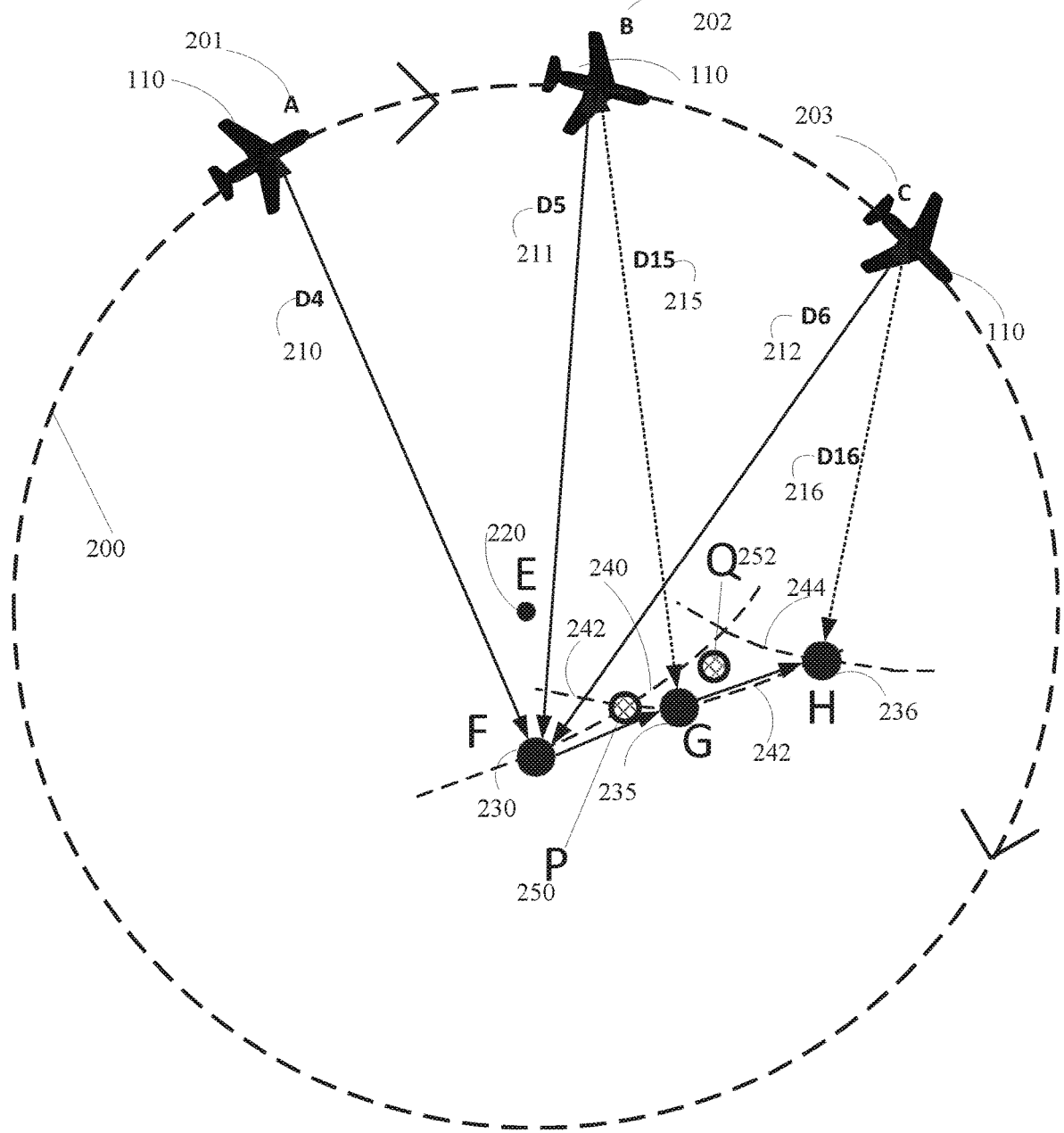
FIG. 2 is a diagram of a location system where a single airborne measuring station 110 is used.

As described above with reference to FIG. 2, based upon a set of measured RTTs and corresponding airborne measuring station 110 locations, and with knowledge of the ground elevation of the target station 120, the airborne measuring station 110 may estimate the position of the target station 120.

A more complete understanding of the present disclosure, and the attendant advantages and features thereof, will be more readily understood by describing the classical method for fitting the RTT measurements to a stationary target position by use of minimization of the summation of the squared residuals (SSR). The method for fitting the RTT measurements to a stationary target position by use of minimization of the summation of the squared residuals (SSR) is known to one skilled in the art.

Assume there are N measurements with index i, of the RTT derived propagation time, $y_i$, from the airborne measuring station 110 to the target station 120 target. For an arbitrary target location, the RTT may be modelled by a function $f(x_i, \alpha)$ where vectors $x_i$ are the are known locations of the airborne measuring station 110, latitude, $x_i^{LAT}$, and longitude, $x_i^{LON}$ and altitude, $x_i^{ALT}$, and where parameter vector $\alpha$ defines the location of the target station 120 in terms of latitude, $\alpha^{LAT}$, and longitude, $\alpha^{LON}$, and altitude, $\alpha^{ALT}$, plus other parameters that may include a turnaround offset, $\alpha^{OFF}$ to be determined. For example, $\alpha^{OFF}$ may include the error in the SIFS of the target station 120.

The target location and offset, $\alpha^{LAT}$, $\alpha^{LON}$, $\alpha^{ALT}$, and offset $\alpha^{OFF}$, may be determined by first defining a square residual, $SR_i$. $SR_i$ is the square of the difference between the measurement of RTT derived propagation time, e.g., using equation (2), $y_i$, and the computation of total travel time, $f(x_i, \alpha)$.

$$SR_i = [y_i - f(x_i, \alpha)]^2 \tag{4}$$

Where $[y_i - f(x_i, \alpha)]$ is the residual, $R_i$ defined as the difference of the RTT derived propagation time, $y_i$, from the computed distance multiplied by the factor (2/c) and modified by offset to convert that distance to a model round trip time.

$$f(x_i, \alpha) = \alpha^{OFF} + \left(\frac{2}{c}\right) * d(x_i, \alpha). \tag{5}$$

Where $d(x_i, \alpha) = \left[(x_i^{LAT} - \alpha^{LAT})^2 + ((x_i^{LON} - \alpha^{LON}) * \cos(x_i^{LAT}))^2 + \left(\frac{x_i^{ALT} - \alpha^{ALT}}{CONVERSION}\right)^2\right]^{\frac{1}{2}}$;

It is noted that the term "CONVERSION" refers to conversion of the altitude units to the geographic distance units where the speed of light is in the units of geographic distance divided by the units of RTT. For example, if latitude and longitude are used for location and microseconds are used for RTT, then c=0.0027027 degrees/microsecond. Longitude distances are scaled by the cosine of the latitude to account for spherical coordinates. All distances are sufficiently small to use planar approximation.

Figure 4:
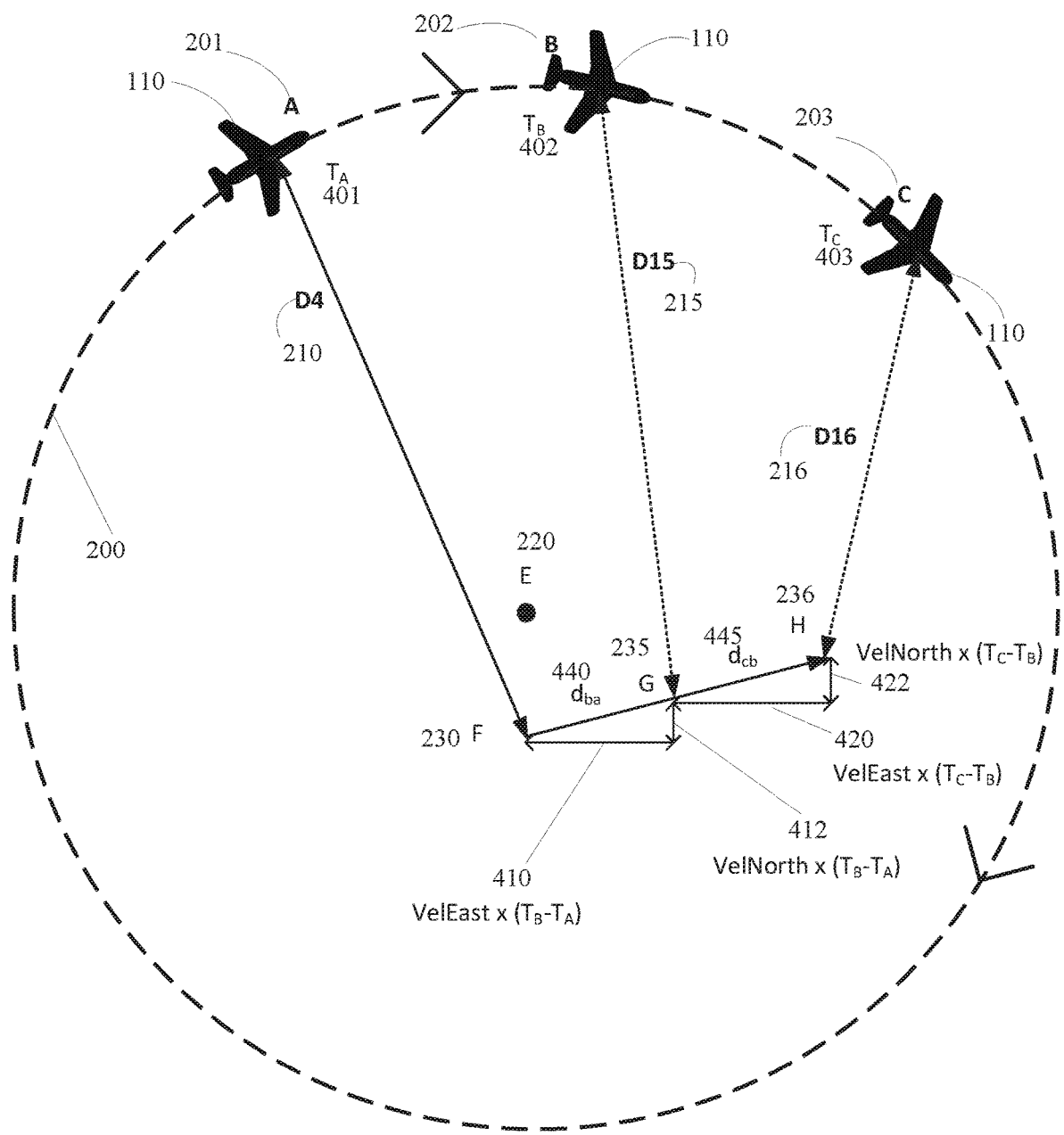
FIG. 4 is a diagram of a location system where a single airborne measuring station is used and the target station is moving from one location to another in accordance with the principles described herein.

Now consider the case of a moving target station 120. FIG. 4 is a diagram of a location system where a single airborne measuring station 110 is used and the target station 120 is moving from location F 230, to G 235 to H 236. The airborne measuring station 110 is at location A 201, at time $T_A$ 401: at location B 202, at time $T_B$ 402; and at location C 203, at time $T_C$ 403. At time $T_A$ 401, the target station 120 is at location F 230. At time $T_B$ 402, the target station 120 is at location G 235. At time Tc 403, the target station 120 is at location H 236. Assuming that the target station 120 is moving at a fixed velocity of v, then the distance $d_{BA}$ 440 between locations F 230 and G 235 is $$d_{BA} = v(T_B - T_A)$$

Similarly, the distance $d_{CB}$ 445 between locations G 235 and H 236 is $$d_{CB} = v(T_C - T_B)$$

The durations $(T_B - T_A)$ and $(T_C - T_B)$ may be expressed as time differences, TD, where TD is the time that has elapsed since the last RTT measurement.

The velocity v may be resolved into two vectors, velocity in the northern direction and velocity in the eastern direction, namely "VelNorth" and "VelEast" respectively.

$$v = \sqrt{(VelEast)^2 + (VelNorth)^2}$$

With reference again to FIG. 4, the distance $d_{BA}$ 440 can be resolved into VelEast×$(T_B - T_A)$ 410 and VelNorth×$(T_B - T_A)$ 412. Similarly, distance $d_{CB}$ 445 can be resolved into VelEast×$(T_C - T_B)$ 420 and VelNorth×$(T_c - T_b)$ 422. The distance $d_{BA}$ 440 can be expressed as:

$$d_{BA} = \sqrt{(VelEast * TD_{BA})^2 + (VelNorth * TD_{BA})^2}$$

Where $TD_{BA} = (T_B - T_A)$

Similarly, the distance $d_{CB}$ 445 can be expressed as:

$$d_{CB} = \sqrt{(VelEast * TD_{CB})^2 + (VelNorth * TD_{CB})^2}$$

Where $TD_{CB} = (T_C - T_B)$

As discussed above for the stationary case, for an arbitrary target location, the RTT may be modelled by a function $f(x_i,$ α) where vectors $x_i$ are the are known locations of the airborne measuring station 110, latitude, $x_i^{LAT}$, and longitude, $x_i^{LON}$ and altitude, $x_i^{ALT}$. In the case of a moving target, a vector element $x_i^{TD}$ may be added to $x_i$ which represents the (negative) time span that has elapsed between time of the corresponding RTT and time of the current location. For the parameter vector α that defines the location of the target station 120 in terms of latitude, $\alpha^{LAT}$, and longitude, $\alpha^{LON}$, and altitude, $\alpha^{ALT}$, and offset $\alpha^{OFF}$ additional terms may be required. As a target station moves, the standard RTT model for the static case becomes unusable as the model assumes that all RTTs to contribute to a single location. Velocity terms, $\alpha^{VelNorth}$ and $\alpha^{VelEast}$, may be introduced as new parameters to represent a target in motion. With these additional parameters, the RTTs no longer fit a single location, and the model can account for changes in location due to velocity and time to adjust the previous distances.

The moving target current location, velocity, and offset, $\alpha^{LAT}$, $\alpha^{LON}$, $\alpha^{ALT}$, $\alpha^{VelNorth}$, $\alpha^{VelEast}$ and $\alpha^{OFF}$, may now be determined by the square residual $SR_i$ equation (5), and the computation of total travel time $f(x_i, \alpha)$, equation (6), where $[y_i - f(x_i, \alpha)]$ is the residual, $R_i$ defined as the difference of the RTT derived propagation, e.g., time using equation (2), $y_i$, from the computed distance multiplied by the factor (2/c) and modified by offset to convert that distance to a model round trip time.

$$f(x_i, a) = \alpha^{OFF} + \left(\frac{2}{c}\right) * d(x_i, a). \quad (6)$$

For a moving target, however, $d(x_i, \alpha)$ is now defined as follows:

$$d(x_i, \alpha) = \left[ (x_i^{LAT} - (a^{LAT} + a^{VelNorth} * x_i^{TD}))^2 + (x_i^{LON} - (\alpha^{LON} + (a^{VelEast} * x_i^{TD})) * \cos(x_i^{LAT}))^2 + \left(\frac{x_i^{ALT} - \alpha^{ALT}}{CONVERSION}\right)^2 \right]^{\frac{1}{2}} \quad (7)$$

Where α is the target current location parameters $x_i^{TD}$ is the negative time span of the corresponding RTT and the current time, and $\alpha^{VelEast}$ is in degrees latitude per time and is converted to the spherical coordinate by multiplying by $\cos(x_i^{LAT})$ before converting the units to mph or m/s If the errors are Gaussian, then the best value for the target location parameters, α, may be obtained by minimizing the sum of the square residuals (SSR=$\Sigma_i$ S $R_i$) which is defined by setting the gradient of the SSR to zero:

$$0 = \nabla_\alpha(\Sigma_i SR_i) = -2\Sigma_i[y_i - f(x_i,\alpha_i)][\nabla_\alpha f(x_i,\alpha_i)] \quad (8)$$

$$\text{A Jacobian } J_{i\alpha} \text{ may be defined as } J_{i\alpha} = \nabla_\alpha f(x_i,\alpha_i) \quad (9)$$

The Jacobian $J_{i\alpha}$ may be utilized to define the direction to the minimum, known as the Steepest Descent method, may be utilized to define the direction and step size to the minimum, known as the Gauss-Newton method, or may be utilized to define the end stage direction and step size to the minimum, known as the Levenberg-Marquardt method.

Once this minimum is found, then the confidence ellipse can be found using the Jacobian $J_{i\alpha}$ evaluated with the parameter values determined by the fit. In the first step the Hessian $H_{\alpha'\alpha}$ may approximately be defined by $$H_{\alpha'\alpha} = \Sigma_i [J_{i\alpha}]^T J_{i\alpha} \quad (10)$$

followed by a correlation matrix $\rho_{\alpha'\alpha}$ defined as the inverse of the Hessian $H_{\alpha'\alpha}$:

$$\rho_{\alpha'\alpha} = H_{\alpha'\alpha}^{-1} \quad (11)$$

Then a confidence ellipse, comprising length, width and orientation θ, may then be defined for the resulting location, as per Table 1:

Table 1—Location Confidence Ellipse Parameters $\text{Tan}(2\Theta) = 2*\rho_{01}/(\rho 00 - \rho 11)$ $\text{Length}^2 = \rho_{00} \cos(\Theta)\cos(\Theta) + \rho_{11} \sin(\Theta)\sin(\Theta) + 2\rho_{01} \cos(\Theta)\sin(\Theta)$ $\text{Width}^2 = \rho_{11} \cos(\Theta)\cos(\Theta) + \rho_{00} \sin(\Theta)\sin(\Theta) - 2\rho_{01} \cos(\Theta)\sin(\Theta)$ As discussed above, a standard technique to determining the best fit to function, $f(x_i, \alpha)$, is by utilization of the method of minimization of sum of square residuals, SSR, also known as the least square residuals. For non-linear functions, such as $f(x_i, \alpha)$, there are various iterative methods that may be utilized including those known as Steepest Descent, Gauss-Newton, and Levenberg-Marquardt. These methods should be known to one skilled in the art.

Figure 5:
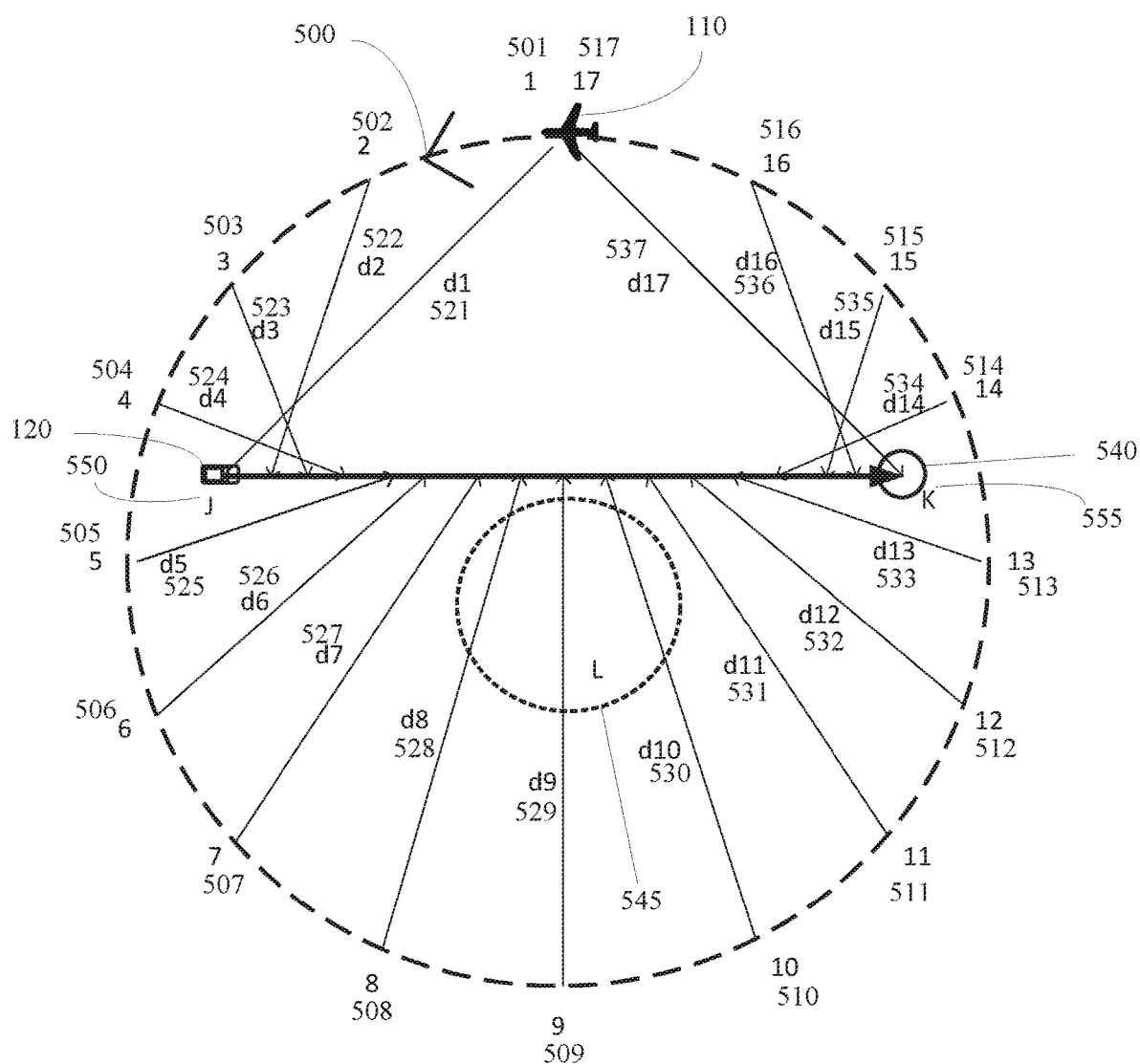
FIG. 5 is an illustration of a moving target station together with illustrative calculated positions with and without the extra moving parameters, $\alpha^{VelNorth}$ and $\alpha^{VelEast}$, in accordance with the principles described herein.

FIG. 5 is an illustration of a moving target station 120 together with illustrative example calculated positions with and without the extra moving parameters, $\alpha^{VelNorth}$ and $\alpha^{VelEast}$. The airborne measuring station 110 is depicted being flown in an orbit 500 (e.g., a circular orbit) starting at position 1 501 and continuing around the orbit 500 in an anticlockwise direction. Although the orbit 500 is shown in an anticlockwise direction, the orbit 500 is not limited as such and may be in any direction. Initially, consider that when the airborne measuring station 110 is at position 1 501, the target station 120 is located at J 550, travelling towards position K 555 at a constant velocity. The distance from the airborne measuring station 110 and the target station 120 is d1 521. In this illustration, the target station 120 moves in an easterly direction from location J 550 to location K 555 in the same time that airborne measuring station 110 completes a full orbit starting at position 1 501 and ending at position 17 517, where positions 1 501 and 17 517 represent a full orbit. For illustrative purposes it is assumed that the RTT, and hence the distance d between the airborne measuring station 110 and the target station 120, is measured every 22.5 degrees of the orbit 500 at positions 1 501 through 17 517. For each 22.5 degree of orbit, the airborne measuring station 110 will move $\frac{1}{16}^{th}$ of the distance between locations J 550 and K 555. In this example the velocity north, VelNorth, of the target station 120 is zero, and the time difference TD is the time for the airborne measuring station 110 to travel 22.5 degrees of orbit. When airborne measuring station 110 is a position 2 502, the distance between the airborne measuring station 110 and the target station 120 is d2 502. Similarly, as the airborne measuring station 110 is at position 3 503 to 17 517, the distances to the target station are d3 523 to d17 537 respectively.

Figure 6:
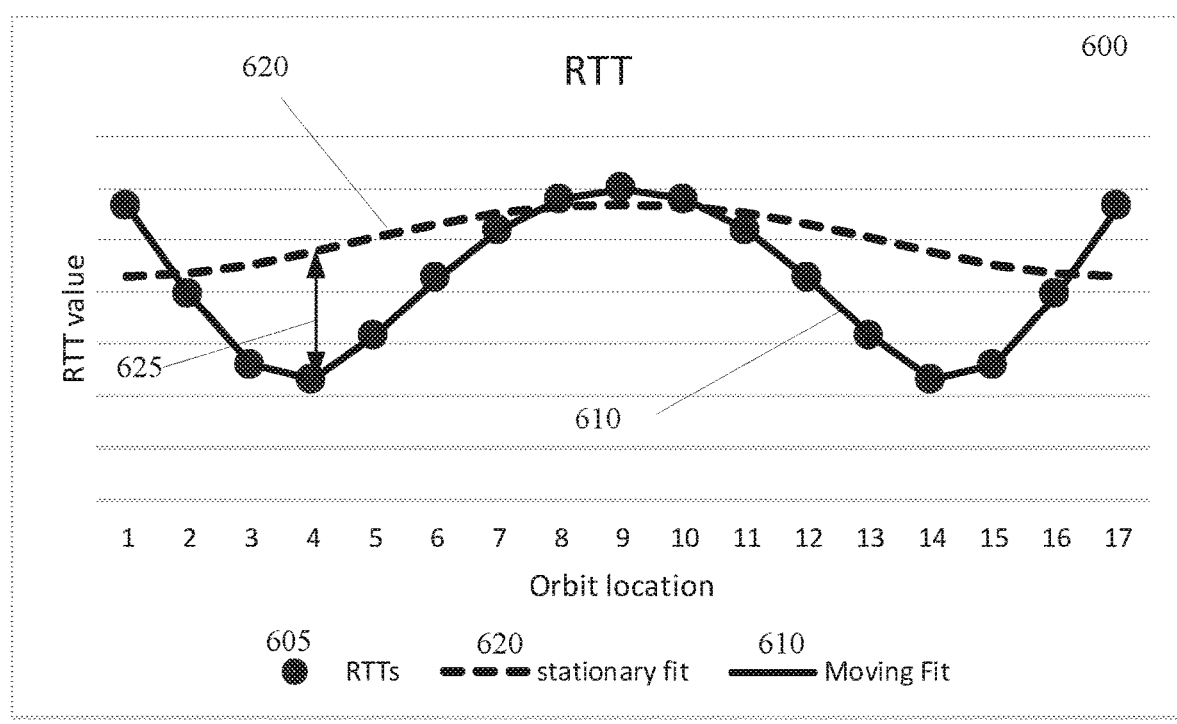
FIG. 6 is a graphical representation of the RTT derived propagation times plotted against the positions as depicted in FIG. 5 in accordance with the principles described herein.

FIG. 6 is a graphical representation 600 of the RTT derived propagation times taken based on the pattern in FIG. 5, plotted against the positions 1 501 to 17 517. The measured RTTs propagation times, 605 are related to the distances d1 521 to d17 537. As discussed above with reference to equation (7) the best curve fit 610, which includes the "moving parameters" $\alpha^{VelEast}$, $\alpha^{VelNorth}$ fits the RTT propagation times 605. The best curve fit 620, however, does not fit the RTT propagation times 605 because the fit is derived assuming a stationary target, as discussed above with reference to equation (6), i.e., the curve fit 620 does not include the moving parameters. Referring again to FIG. 5, the final estimated location of the target station 120, calculated using all the RTTs propagation times 605 as shown in FIG. 6, is at location L 545. The location L is depicted as a large area representing a large uncertainty, as the best fit 620 has large differences to the measured RTT derived points, for example as demonstrated by the difference 625 between the curve fit 620 and the RTT propagation times 605 at the orbit position 4 in FIG. 6. Conversely, final estimated location of the target station 120, as determined by the curve fit 610 that includes the moving parameters, is at location K 555, the true location.

FIGS. 5 and 6 represent an example situation (e.g., an idealized situation) for ease of understanding in order to demonstrate an embodiment of this disclosure. In cases where a target station 120 is moving at a constant velocity, by the inclusion of the "moving parameters" $\alpha^{VelEast}$, $\alpha^{VelNorth}$ in the square residual $SR_i$ equation (5) and the computation of total travel time $f(x_i, \alpha)$, as used in equations (6) and (7), the updated location of the target station 120 can be continuously estimated. In the general case where the target station 120 may be changing velocity, provided that the variations are not extreme, one half of an orbit may be required to determine the average velocity. The validity of the addition of the moving parameters, to the stationary model parameters, may be tested by use of the F-test. In the case that the F-test fails then the stationary model may be used.

Figure 7:
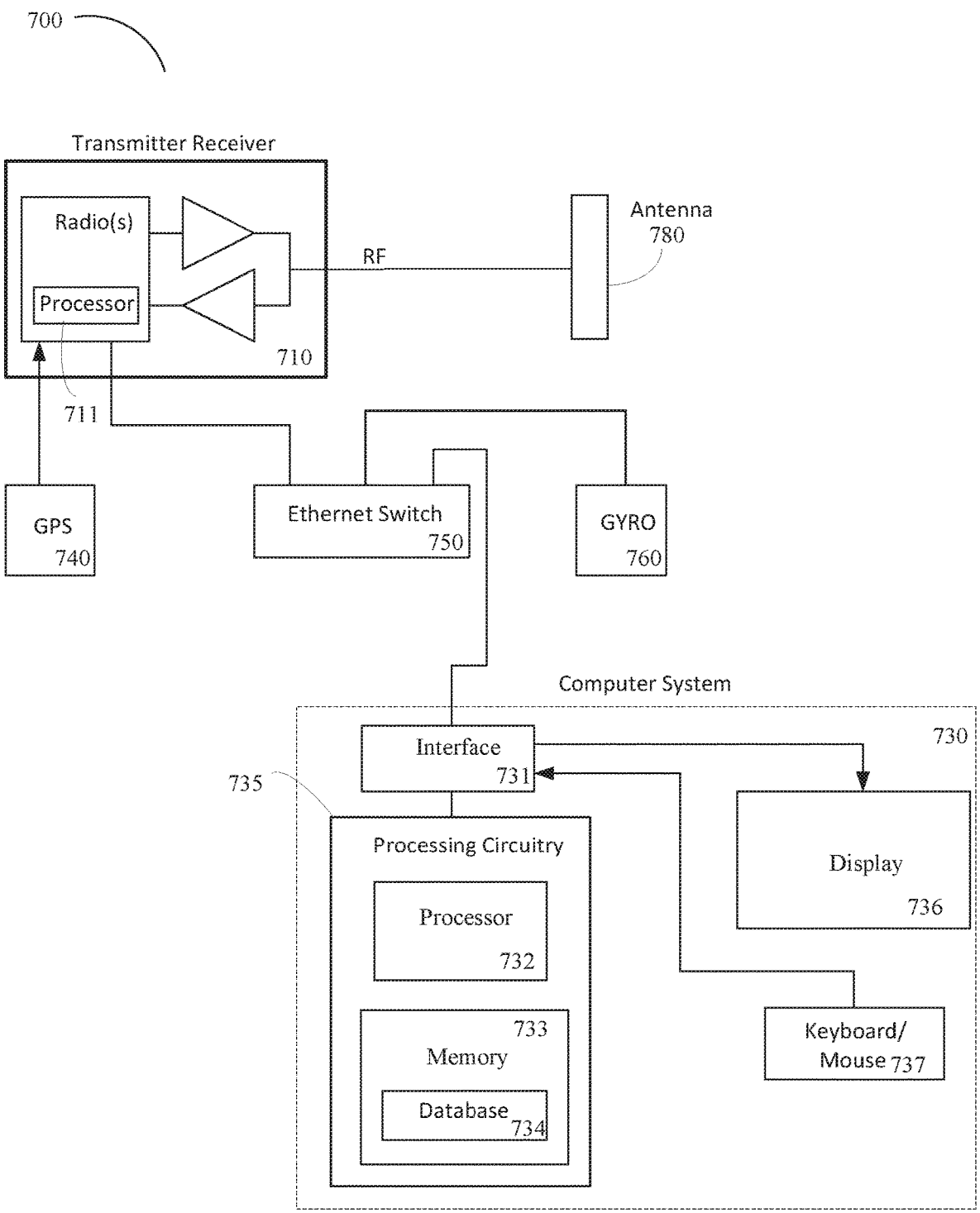
FIG. 7 is a block diagram of an example measuring system that is used in accordance with the principles described herein.

FIG. 7 is a block diagram of an example measuring system 700 that is used in accordance with the principles described herein. In one embodiment, measuring system 700 may be all or part of the airborne measuring station 110. In one embodiment, measuring system 700 may include an antenna assembly 780, a transmitter receiver 710, a computer system 730, a global positioning system (GPS) module 740, a gyro module 760 and/or a network switch 750, such as an Ethernet switch. Measuring system 700 may be referred to as a wireless device (WD).

The transmitter receiver 710 may transmit or receive radio frequency (RF) signals to and from the antenna assembly 780. The GPS module 740 output may be connected to the transmitter receiver 710. The GPS module 740 may provide GPS information (e.g., location information), including the latitude, longitude, and altitude of the airborne platform. The transmitter receiver 710 may append the GPS information to any RF transmission and/or reception. The network switch 750 may be connected to the transmitter receiver 710, and the computer system 730. The transmitter receiver 710 may include a radio having a processor 711. The processor need not be part of the radio. The GPS information may be provided to the processor 711 by the GPS module 740. RF receptions may have the GPS information added such that the position of the airborne platform is known for each received signal. The transmitter receiver 710 may include more than one radio. Therefore, any transmission may be automatically received by another radio within the transmitter receiver 710, and by this means, the airborne platform position is also known for each transmission. The GPS information may be sent to the network switch 750 and therefore made available to the computer system 730.

The computer system 730 may include an interface 731. Interface 731 may contain a connection (e.g., an Ethernet connection) to the network switch 750 (e.g., Ethernet switch), the connection to a display 736, a connection to a keyboard and mouse 737 as well as interfacing to the processing circuitry 735. In some embodiments, the processing circuitry 735 may include a processor 732, a memory 733, and/or a database 734. The database 734 may store the ground mapping information of the area of interest, and the processor 732 and memory 733 may be used to carry out the exemplary processes 930 and/or 940 and/or any other process/method/step, described in the present disclosure, using information on the position of the airborne platform determined/derived from the GPS module 740, the gyro module 760, and/or information on the target station 120 which may be inputted using the keyboard and mouse 737. The display 736 may be used to show the ground map together with the estimated location and/or confidence ellipse of the target station 120 which may be derived using the example process 940, described below. Note that the modules discussed herein may be implemented in hardware or a combination of hardware and software. For example, the modules may be implemented by a processor executing software instructions or by application specific integrated circuitry, e.g., processing circuitry, configured to implement the functions attributable to the modules. Also note that the term "connected to" as used herein refers to "being in communication with" is not intended to mean a physical connection nor a direct connection, i.e., may be any type of connection/communication. It is contemplated that the signal path between one element and another may traverse multiple physical devices.

Thus, in some embodiments, the processing circuitry 735 may include the memory 733 and a processor 732, the memory 733 containing instructions which, when executed by the processor 732, configure the processor 732 to perform the one or more functions/processes/methods/steps described herein. In addition to a traditional processor and memory, the processing circuitry 735 may comprise integrated circuitry for processing and/or control, e.g., one or more processors and/or processor cores and/or FPGAs (Field Programmable Gate Array) and/or ASICs (Application Specific Integrated Circuitry).

The processing circuitry 735 may include and/or be connected to and/or be configured for accessing (e.g., writing to and/or reading from) the memory 733, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 733 may be configured to store code executable by control circuitry and/or other data, e.g., data pertaining to communication, e.g., configuration and/or address data of nodes, etc. The processing circuitry 735 may be configured to control any of the methods described herein and/or to cause such methods to be performed, e.g., by the processor 732. Corresponding instructions may be stored in the memory 733, which may be readable and/or readably connected to the processing circuitry 735. In other words, the processing circuitry 735 may include a controller, which may comprise a microprocessor and/or microcontroller and/or FPGA (Field-Programmable Gate Array) device and/or ASIC (Application Specific Integrated Circuit) device. It may be considered that the processing circuitry 735 includes or may be connected or connectable to memory, which may be configured to be accessible for reading and/or writing by the controller and/or processing circuitry 735.

Figure 8:
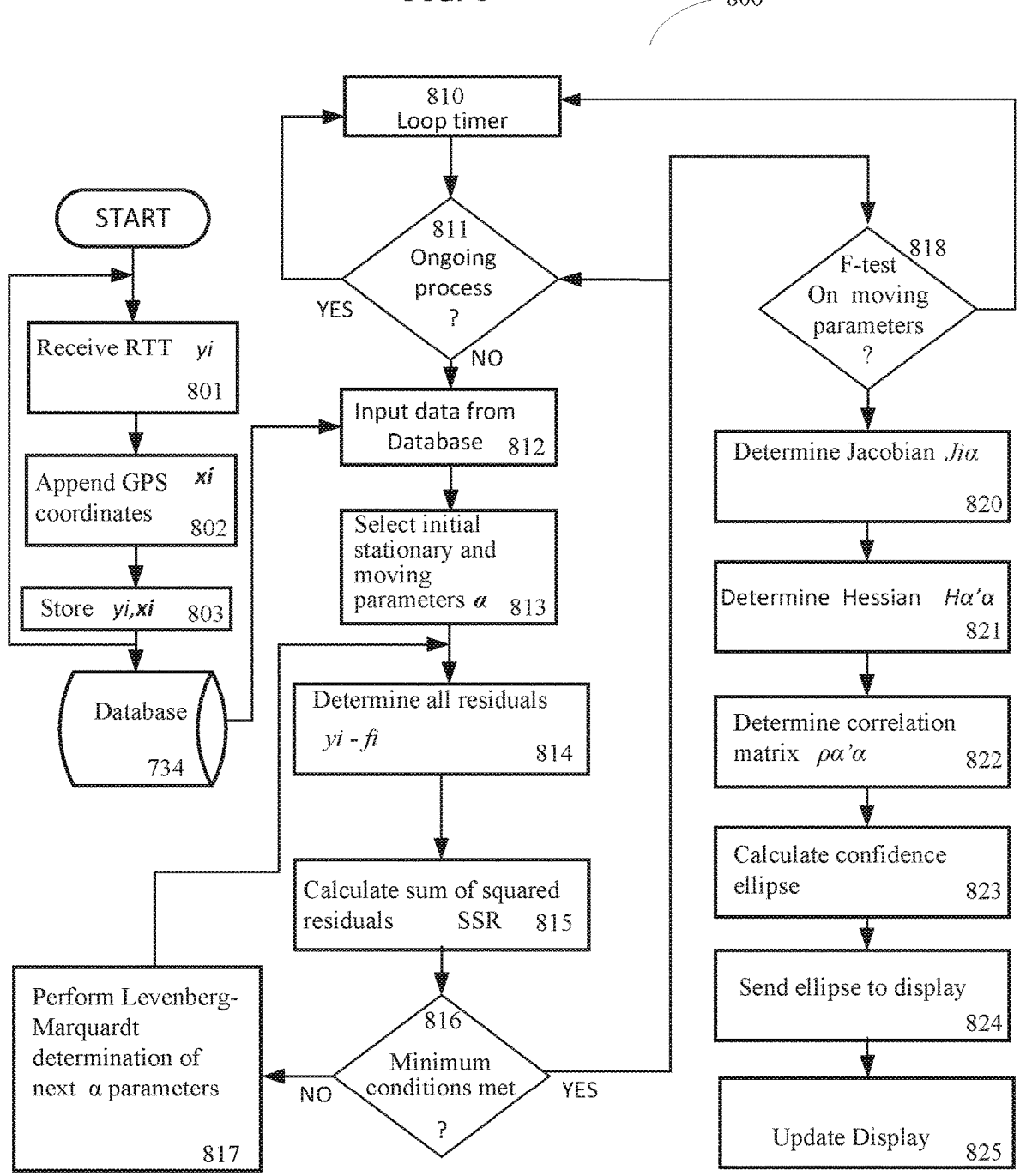
FIG. 8 is a flowchart of a non-limiting example of a method for determining the best fit model for a set of RTTs corresponding to a target station moving at a constant velocity, and displaying the corresponding calculated confidence ellipse of the location of the target station according to some embodiments of the present disclosure.

FIG. 8 is a flowchart of a non-limiting example of a method 800 for determining the best fit model for a set of RTTs corresponding to a target station 120 moving at a constant velocity and displaying the corresponding calculated confidence ellipse of the location of the target station 120 according to an embodiment of the disclosure.

Method 800 may include four processes:

Process 1—receiving RTTs, appending the positional data of the airborne station, and storing the datasets in a database (steps 801, 802, and 803);

Process 2—at preset intervals, inputting the datasets from the database and selecting initial parameters (steps 810, 811, 812 and 813);

Process 3—performing the minimizing of the sum of the squared residuals to find the best fit parameters (steps 814, 815, 816, 817, and 818); and Process 4—calculating and displaying the location confidence ellipse for the target station (steps 820, 821, 822, 823, 824, and 825).

Figure 3:
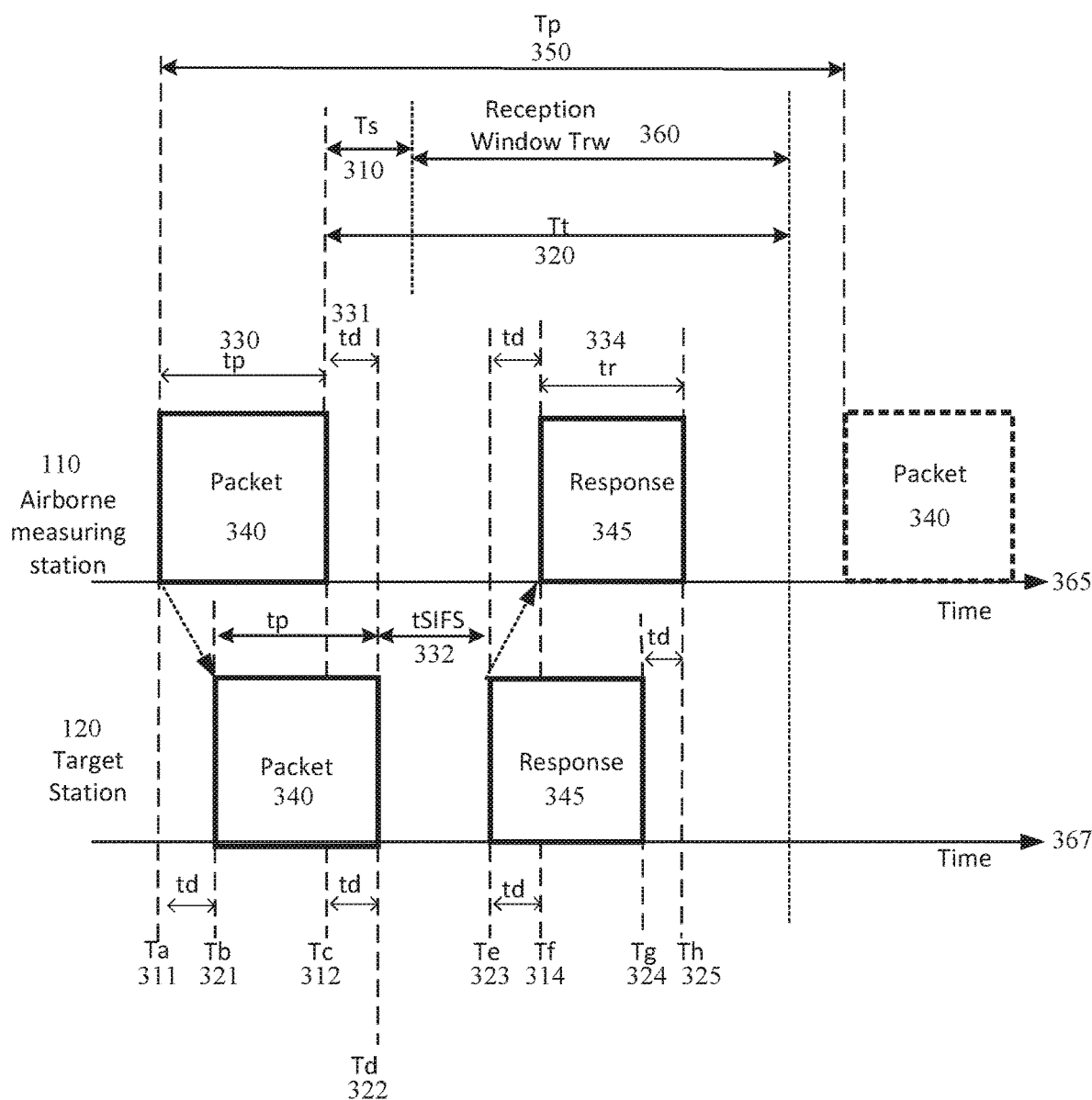
FIG. 3 is a timing diagram that describes a ranging method of the present disclosure that may be used to determine the distance between two wireless devices.

The method 800 may start at step 801 where an RTT, $y_1$, is received. The RTT may be the result of an exchange of a ranging packet 340 transmitted by transmitter receiver 710 and the reception of a response packet 345, from a target station 120, received by transmitter receiver 710 as discussed above with reference to FIGS. 3 and 7. The location coordinates, $x_1$, of the measuring system 700 are appended to the RTT (Step 802). The processor 711 in the transmitter receiver 710 may obtain the location coordinates from the GPS module 740, via the network switch 750, and then append them to the RTT data. The RTT and location data, ($y_1$, $x_1$), are stored in a database 734 (Step 803), and the process returns to step 801 where another RTT is received. Database 734 may reside in the processing circuitry 735 in the computer system 730. Each RTT and location co-ordinates pair, ($y_1$, $x_1$), from processor 711 may be sent to the database 734 residing in processing circuitry 735.

A loop timer is active (step 810). The loop timer may begin at the reception of the first RTT or when a user starts the location process via the keyboard/mouse 737 (e.g., keyboard and/or mouse module). For example, a loop time of a predetermined interval of time, e.g., 5 seconds, may be used, and hence step 810 may then output a signal every predetermined interval of time, e.g., 5 seconds, to step 811. A check may be made at step 811 if there is an ongoing process active. Such a process may comprise Process 3, as outlined above. The loop timer function and the active process check may be performed by the processing circuitry 735 in the computer system 730. If there is no ongoing process the dataset ($y_i$, $x_i$) is taken from the database 734 (step 812). Hence, for example, every 5 seconds the stored dataset, ($y_i$, $x_i$) is inputted from the database 734. Step 812 may include a check that the number of sets in the dataset exceeds a predetermined number. A set of initial parameters α are selected (step 813). The initial parameters α represent a starting location for the target station 120 in terms of latitude, $\alpha^{LAT}$, longitude, $\alpha^{LON}$ and altitude $\alpha^{ALT}$, plus the moving parameters $\alpha^{VelEast}$, $\alpha^{VelNorth}$, and $x_i^{TD_i}$, and a distance measurement offset, $\alpha^{OFF}$. Any set of values may be used for an initial location. Examples for the starting location may include the location of the measuring system 700, as provided by the GPS module 740, or the location E 220 at the center of the orbit 200.

The two sets of residuals [$y_i - f(x_i, \alpha)$], where $f(x_i, \alpha)$ is defined by equation (5) for the stationary model and equation (6) for the moving model, may be determined at step 814. Steps 814, 815, 816 and 817 may comprise a loop where minimizing the sum of the square residuals is performed as described above with reference to equations (8), and (9). The loop modifies the parameters to find the best fit and continues until the minimum conditions are met in step 816. The loop process is now described. The sum of squared residuals, SSR, as discussed above with reference to equation (8), may be calculated (step 815). It may be determined, at step 816, if the minimum conditions have been met, and if not, the Levenberg-Marquardt non-linear fitting scheme may be performed, at step 817, to determine a next set of values for the α parameters. After completion of the calculations in step 817, the minimization process returns to step 814. At step 816, two minimum conditions may be checked to determine if the process has found the minimum (where j refers to the current iteration and j−1 refers to the previous iteration):

$$(SSR_j - SSR_{j-1}) < \Delta \qquad \text{Condition a)}$$

$$ABS|\alpha_j - \alpha_{j-1}| < \Delta, \qquad \text{Condition b)}$$

where Δ has a very small value. For example, a value for Δ may be in the order of $10^{-6}$. If either of these two conditions (i.e., a and/or b) is met, in step 816, it is determined that the minimization loop process, steps 814, 815, 816, and 817, is complete, and step 816 may indicate to step 811 that the process is complete. At completion of step 816 the two sets of parameters for the moving model and the stationary model are available. The minimization loop consisting of steps 814 to 817 may be performed by the processing circuitry 735 in the computer system 730.

An F-test may be performed at step 818. An F-test may be used to indicate if the regression model using the moving parameters is a better fit in terms of F-test than the model using the stationary parameters. If the F-test passes, then the process advances to step 820. If the F-test fails and the stationary model meets the minimum conditions at step 816, then the process advances to step 820 using only the stationary model parameters. If the F-test fails and the stationary model does not meet the minimum conditions in step 816 then the process may return to step 810, the loop timer. The F-test may be performed by the processing circuitry 735 in the computer system 730. The use of the F-test is known to those skilled in the art of non-linear least square fitting.

The Jacobian $J_{i\alpha}$, as discussed above with reference to equation (9), is determined at step 820. The Hessian $H_{\alpha'\alpha}$, as described above with reference to equation (10), may be determined, at step 821, based upon the Jacobian determined in step 820. The correlation matrix $\rho_{\alpha'\alpha}$, as described above with reference to equation (11), may be determined at step 822. The location confidence ellipse parameters, as described above with reference to Table 1, may be calculated at step 823 and the location confidence ellipse parameters are sent to a display at step 824. Steps 820 to 824 may be performed by the processing circuitry 735 in the computer system 730. The display that is showing the target location may be updated at step 825 with the new parameters from step 823. Display 736 in the computer system 730 may be utilized as the display for the location of the target station 120.

FIG. 9 is a flow diagram of an example process 900 for determining, according to some embodiments of the present disclosure, the geo-location of a target station, moving at a constant velocity, using an approach that utilizes a method of minimization of the summation of the squared residuals SSR. Process 900 may include four processes 910, 920, 930 and 940 that correspond to the Process 1, Process 2, Process 3, and Process 4 described above with reference to FIG. 8.

Process 900 starts with Process 1, 910. Process 1, 910 includes and starts at step 911 where RTTs, $y_i$, are received. The RTTs are the result of exchanges of ranging packets 340 transmitted by transmitter receiver 710 and the reception of response packets 345, from a target station 120, received by transmitter receiver 710, as discussed above with reference to FIGS. 3 and 4. Note that the RTTs include the time t of the RTT. Process 1, 910 includes step 912 where the GPS location co-ordinates $x_i$ of the measuring system 700 (which is also the airborne measuring station 110), are appended to the RTTs. The location coordinates, corresponding to each received RTT, are obtained from the GPS module 740 and appended to the RTTs by the processor 711 in the Transmitter Receiver 710. Process 1, 910 includes step 913 where the RTT and location data, $(y_i, x_i)$, is stored in a database. The database 734 resides in the processing circuitry 735 in the computer system 730 and each RTT and location co-ordinates pair, $(y_i, x_i)$, from processor 711, is sent to the database 734 residing in processing circuitry 735. Process 1, 910, continues to run until a user terminates the location operation via the keyboard/mouse 737 which provides a command to the processing circuitry 735 and the transmitter receiver 710 to cease the operation. Hence, over time, the dataset in the database (step 913) becomes larger.

Process 2, 920, includes and starts with step 921 where the dataset in the database (step 913) is inputted. The inputting of the dataset from the database is performed at a preset regular interval, e.g., 5 seconds. Step 921 is followed by step 922 where an initial set of parameters, $\alpha$, are selected. These initial parameters represent a current location for the target station 120 or the center of the orbit in terms of latitude, $\alpha^{LAT}$, longitude, $\alpha^{LON}$, and the corresponding ground altitude, $\alpha^{ALT}$, plus the moving parameters $\alpha^{VelEast}$, $\alpha^{VelNorth}$, plus a distance measurement offset, $\alpha^{OFF}$. The GPS parameters of the measuring system 700 (which may also be the airborne measuring station 110 and/or refer to a wireless device) or the center of the orbit, are used for $\alpha^{LAT}$, longitude, $\alpha^{LON}$, and corresponding ground altitude, $\alpha^{ALT}$, and a preset initial offset $\alpha^{OFF}$ of 314 μs or 60 μs is used (depending on spread spectrum technique), based upon a receive packet length of 304 μs or 50 μs plus a SIFS of 10 μs. The GPS parameters are provided by the GPS module 740. Initial values of zero are used for the parameters $\alpha^{VelEast}$, $\alpha^{VelNorth}$. Process 2, 920, is performed by the processing circuitry 735 within the computer system 730. The dataset and the initial parameters are then inputted to Process 3, 930.

Process 3, 930, includes and starts with step 931 where a series of determinations and calculations take place on the inputted data from Process 2, 920, step 922. In step 931, the two sets of residuals $[y_i-f(x_i, \alpha)]$ are first determined. One set of residuals is defined by equation (5) for the stationary model and the other by equation (6) for the moving model. The sum of the squared residuals, SSR, for each model, is then calculated, as discussed above with reference to equations (4), (6) and (7). The determinations and calculations in Step 931 are performed by the processing circuitry 935 in the computer system 730. Process 3, 930, includes step 932 where two minimum conditions are checked to determine if the process has found the minimum. The conditions checked are:

$(SSR_j - SSR_{j-1}) < 10^{-6}$      Condition a)

$ABS|\alpha_j - \alpha_{j-1}| < 10^{-6}$,      Condition b)

where j refers to the current iteration and j−1 refers to the previous iteration. Process 3, 930 includes step 933. If neither condition (i.e., a nor b) is met, then step 932 is followed by step 933 where the Levenberg-Marquardt non-linear fitting scheme is performed to determine next values for the $\alpha_j$ parameters. These new parameters are then presented to step 931, and the minimization process, as described for steps 931, 932 and 933 continues until, at step 932, one of the conditions (i.e., a or b) is true. If either condition, (i.e., a or b), is true then the parameters are inputted to Process 4, 940, and a signal is sent to Process 2, 920, step 921 informing at step 921 that the minimization has been completed for the last dataset that was inputted from Process 2, 920, to Process 3, 930. If the preset regular interval, e.g., 5 seconds, has elapsed since Process 2, 920, inputted the last dataset to Process 3, 930, then Process 2, 920, inputs the updated complete dataset to Process 3, 930. If the preset regular interval, e.g., 5 seconds, has not elapsed since Process 2, 920, inputted the last dataset to Process 3, 930, then Process 2, 920, waits until the preset regular interval, e.g., 5 seconds, has elapsed before inputting the updated complete dataset to Process 3, 930.

Before exiting Process 3, an F-test is performed at step 934 to test if the model with the addition of the moving parameters $\alpha^{VelEast}$, $\alpha^{VelNorth}$ produces a better F-test fit than the nested model with just the stationary parameters. If the F-test passes, then the process continues to Process 4 940. If the F-test fails and the stationary model meets the minimum conditions at step 932, then Process 4 proceeds using the stationary parameters. If the F-test fails and the stationary model does not meet the minimum conditions, the process may return to 921 to wait for a new input of datasets.

Process 4, 940, includes and starts with step 941 where Jacobian $J_{i\alpha}$, as discussed above with reference to equation (9), is determined. The Hessian $H_{\alpha'\alpha}$, as described above with reference to equation (10), is then determined based upon the Jacobian and the correlation matrix $\rho_{\alpha'\alpha}$, as described above with reference to equation (11), is also determined followed by the calculation of the location confidence ellipse parameters, as described above with reference to Table 1. Process 4, 940, includes and step 941 is followed by step 942 where the updated location ellipse parameters are sent to the display 736 in the computer system 730.

Process 900 continues until the user terminates the operation via the keyboard/mouse 737.

The model fit as described above is valid as long as the velocity of the target station 120 is relatively constant. In order to derive a location for a moving target station 120, the airborne measuring station 110 needs to complete a portion of its orbit that produces enough RTTs together with a variation in subtended angles. In the general sense, about half an orbit for the airborne measuring station 110 is required such that a location for a moving target station 120 can be determined. The F-test as described above with reference to step 934 can be used to check if the moving parameters are still valid. This process is repeated including new data at a regular time interval, for example, 5 seconds, so as to track the changing velocity.

FIG. 10 is a flow diagram of an example process 1000 for determining a best-fit geo location of a target station 120 according to some embodiments of the present disclosure. The process 1000 is implemented in a wireless device (WD), e.g., measuring system 700. One or more blocks described herein, e.g., steps 1001-1005, may be performed by one or more elements of the measuring system 700 such as by one or more of processor 711, processor 732, processing circuitry 735, and transmitter receiver 710. The best-fit geo-location of the target station 120 is determined using a plurality of round-trip times (RTTs), where each RTT is a time elapsed between a transmission of a ranging packet by the WD (e.g., measuring system 700) and a reception of a response packet by the WD. The target station 120 is movable. The process 1000 includes, at step 1001, assigning values to current target station parameters. The current target station parameters include a current location for the target station 120 and movement parameters. At step 1002, a plurality of square residuals is determined based at least in part on the current target station parameters. Each square residual of the plurality of square residuals corresponds to one RTT. At step 1003, a minimum of a sum of squared residuals (SSR) is determined based at least on the plurality of square residuals. At step, 1004, best-fit parameters are determined based at least in part on the determined minimum of the SSR. Further, at step 1005, the best-fit geo-location of the target station is determined based at least on the best-fit parameters.

In some embodiments, determining the plurality of square residuals further includes determining a first group of residuals based on stationary parameters and a second group of residuals based on the movement parameters, and for each of the first group and the second group of residuals: determining a model fit probability based at least in part on one of the determined first group of residuals and the determined second group of residuals; determining the SSR; performing non-linear fitting based at least on the calculated SSR; determining new parameters based at least on the non-linear fitting; and determining new residuals based at least in part on the determined new parameters.

In some other embodiments, performing non-linear fitting and determining new parameters are further based on a Levenberg-Marquardt process.

In an embodiment, process 1000 further includes performing an F-test to determine whether the non-linear fitting corresponding to the moving parameters is a better fit than the non-linear fitting corresponding to the stationary parameters. If the non-linear fitting corresponding to the moving parameters is the better fit, the non-linear fitting corresponding to the moving parameters is used to determine the best-fit geo-location. If the non-linear fitting corresponding to the moving parameters is not the better fit and one of a first condition is met and a second condition is met, the non-linear fitting corresponding to the stationary parameters to is used to determine the best-fit geo-location. The first condition is met when a first difference between an SSR and a subsequent SSR is less than a predetermined minimum. The second condition is met when an absolute value of a second difference between a target station parameter and a subsequent target station parameter is less than the predetermined minimum.

In another embodiment, the first group of residuals is defined by:

$$f(x_i, \alpha) = \alpha^{OFF} + \left(\frac{2}{c}\right) * d(x_i, \alpha).$$

$$\text{Where } d(x_i, \alpha) = \left[(x_i^{LAT} - \alpha^{LAT})^2 + ((x_i^{LON} - \alpha^{LON}) * \cos(x_i^{LAT}))^2 + \left(\frac{x_i^{ALT} - \alpha^{ALT}}{CONVERSION}\right)^2\right]^{\frac{1}{2}};$$

and the second group of residuals is defined by:

$$f(x_i, \alpha) = \alpha^{OFF} + \left(\frac{2}{c}\right) * d(x_i, \alpha),$$

$$\text{Where } d(x_i, \alpha) = \left[(x_i^{LAT} - (\alpha^{LAT} + \alpha^{VelNorth} * x_i^{TD}))^2 + ((x_i^{LON} - (\alpha^{LON} + \alpha^{VelEast} * x_i^{TD})) * \cos(x_i^{LAT}))^2 + \left(\frac{x_i^{ALT} - \alpha^{ALT}}{CONVERSION}\right)^2\right]^{\frac{1}{2}},$$

$x_i$ represents WD location parameters, $\alpha$ represents location parameters of the target station, $x_i^{TD}$ is a negative time span of the corresponding RTT and a current time, $\alpha^{VelEast}$ is in degrees latitude per time and is converted to a spherical coordinate by multiplying by $\cos(x_i^{LAT})$ before converting units, and CONVERSION refers to conversion of altitude units to geographic distance units where speed of light is in units of geographic distance divided by units of RTT.

In some embodiments, the target station 120 is moving, and the movement parameters include a first velocity vector in a first direction and a second velocity vector in a second direction.

In some other embodiments, the process 1000 further includes measuring the plurality of RTTs; appending WD location parameters to each RTT of the plurality of RTTs, where the WD location parameters are associated with a location of the WD at a time of the reception of the response packet and are determined based in part on Global Positioning System (GPS) information; storing appended WD location parameters as records in a database; and when a preset period of time has elapsed and a number of stored records in a dataset exceeds a predetermined number, retrieving the stored records from the database to determine the plurality of square residuals.

In an embodiment, the process 1000 further includes determining a target location ellipse for the target station based on the determined best-fit parameters and performing the determination of the best-fit geo location of the target station further based on the determined target location ellipse.

In another embodiment, the process 1000 further includes determining at least one of a Jacobian matrix, a Hessian sum, and a correlation matrix to determine the target location ellipse.

Some embodiments of the present disclosure are as follows:

Embodiment 1. A method for a measuring station for determining a best fit geo-location of a target station, the target station responding to ranging packets transmitted by the measuring station, the method comprising:

measuring a plurality of round-trip times, RTTs, $y_i$, each RTT being a time elapsed between a transmission of a ranging packet and a reception of a response packet;

appending location parameters, $x_i$, to each RTT, $y_i$, the location parameters being associated with the location of the measuring station at a time of receipt of the response packet;

selecting initial parameters, α, the initial parameters representing:
    a starting location for the target station; and
    initial values for parameters related to movement;
iteratively calculating a minimum of a sum of squared residuals, SSR, to find the best fit geo-location of the target station based at least on the plurality of RTTs, $y_i$, appended location parameters, $x_i$, and initial location and moving parameters α;
determining best fit parameters, α, for calculation of a target location ellipse for the target station;
calculating the target location ellipse for the target station; and
determining the best fit geo-location of the target station based at least on the calculated target location ellipse.

Embodiment 2. The method of Embodiment 1, where the moving parameters comprise a velocity in the North direction, "VelNorth", and a velocity in the East direction, "VelEast".

Embodiment 3 The method of Embodiment 1, further including after the appending of location parameters:
    storing appended parameters ($y_i$, $x_i$) as records in a database; and
    when a preset period of time has elapsed and a number of the stored records in a dataset exceeds a predetermined number, retrieving the stored records from the database.

Embodiment 4. The method of Embodiment 1, wherein iteratively calculating SSR further includes:
    determining residuals for stationary and moving parameters, and for each set of residuals:
        calculating a model fit probability based at least on the determined residuals;
        calculating a sum of squared residuals, SSR,
        performing non-linear fitting based at least on the calculated SSR;
        determining new parameters α based at least on the non-linear fitting; and
        determining new residuals based at least in part on the determined new parameters, α.

Embodiment 5. The method of Embodiment 4, wherein performing non-linear fitting and determining new parameters α are further based on a Levenberg-Marquardt method.

Embodiment 6 The method of Embodiment 4, further including performing an F-test to determine that the non-linear fitting using the best fit moving parameters is a better fit in terms of F-test, than the model using the stationary parameters, and,
    if true:
    proceeding with the best fit moving parameters.
    if false:
    proceeding with the best fit stationary parameters Embodiment 7. The method of Embodiment 1, wherein the location parameters, $x_i$, associated with the location of the measuring station are provided by a GPS module.

Embodiment 8. The method of Embodiment 1, wherein the measuring station is airborne.

Embodiment 9. The method of Embodiment 1, further including displaying the calculated target locations ellipses and the best fit geo-locations of the target station, as the target station is moving.

Embodiment 10. A wireless device for a measuring station for determining a best fit geo-location of a target station, the target station responding to ranging packets transmitted by the measuring station, the wireless device comprising:
    a transmitter receiver configured to:
    transmit a ranging packet;
    receive a response packet in response to the transmitted ranging packet; and
    measure a plurality of RTTs, $y_i$, each RTT being a time elapsed between a transmission of a ranging packet and a reception of a response packet; and
    processing circuitry in communication with the transmitter receiver, the processing circuitry being configured to:
        append location parameters, $x_i$, to each RTT, $y_i$, the location parameters being associated with the location of the measuring station at a time of receipt of the response packet;
        select initial parameters, α, the initial parameters representing:
            a starting location for the target station; and
            initial values for parameters related to movement;
        iteratively calculate a minimum of a sum of squared residuals, SSR, to find the best fit geo-location of the target station based at least on the plurality of RTTs, $y_i$, appended location parameters, $x_i$, and initial location and moving parameters α;
        determine best fit parameters, α, for calculation of a target location ellipse for the target station;
        calculate the target location ellipse for the target station; and
        determine the best fit geo-location of the target station based at least on the calculated target location ellipse.

Embodiment 11. The wireless device of Embodiment 10, wherein the moving parameters comprise a velocity in the North direction, "VelNorth", and a velocity in the East direction, "VelEast".

Embodiment 12. The wireless device of Embodiment 10 wherein the processing circuitry, after the appending of location parameters, is further configured:
    store appended parameters ($y_i$, $x_i$) as records in a database; and
    when a preset period of time has elapsed and a number of the stored records in a dataset exceeds a predetermined number, retrieve the stored records from the database.

Embodiment 13. The wireless device of Embodiment 10, wherein the processing circuitry, in order to calculate the SSR is further configured to:
    determine residuals for stationary and moving parameters, and for each set of residuals:
        calculate a model fit probability based at least on the determined residuals;
        calculate a sum of squared residuals, SSR,
        perform non-linear fitting based at least on the calculated SSR;
        determine new parameters α based at least on the non-linear fitting; and
        determine new residuals based at least in part on the determined new parameters, α.

Embodiment 14. The wireless device of Embodiment 13, wherein performing non-linear fitting and determining new parameters α are further based on a Levenberg-Marquardt method.

Embodiment 15 The wireless device of Embodiment 13, wherein the processor is further configured to perform an F-test to determine that the non-linear fitting using the best fit moving parameters is a better fit in terms of F-test, than the model using the stationary parameters, and,
    if true:
    proceed with the best fit moving parameters.
    If false:
    proceed with the best fit stationary parameters.

Embodiment 16. The wireless device of Embodiment 10, wherein the location parameters, $x_i$, associated with the location of the measuring station are provided by a GPS module.

Embodiment 17 The wireless device of Embodiment 10 wherein the measuring station is airborne.

Embodiment 18. The wireless device of Embodiment 11, wherein the measuring station is airborne.

Embodiment 19. A measuring station for determining a best fit geo-location of a target station, the target station responding to ranging packets transmitted by the measuring station, the measuring station comprising:
 a global positioning system (GPS) configured to:
  provide location parameters associated with a location of the measuring station; and
 a wireless device in communication with the GPS, the wireless device comprising:
  a transmitter receiver configured to:
   transmit a ranging packet;
   receive a response packet in response to the transmitted ranging packet; and
   measure a plurality of RTTs, $y_i$, each RTT being a time elapsed between a transmission of a ranging packet and a reception of a response packet; and
  processing circuitry in communication with the transmitter receiver, the processing circuitry being configured to:
   append the location parameters, $x_i$, to each RTT, $y_i$, the location parameters being associated with the location of the measuring station at a time of receipt of the response packet;
   store appended parameters $(y_i, x_i)$ as records in a database;
   when a preset period of time has elapsed and a number of the stored records in a dataset exceeds a predetermined number, retrieve the stored records from the database;
   select initial parameters, $\alpha$, the initial parameters representing:
    a starting location for the target station; and
    initial values for parameters related to movement;
   determine residuals for stationary and moving parameters, and for each set of residuals:
    calculate a model fit probability based at least on the determined residuals;
    calculate a sum of squared residuals, SSR,
    perform non-linear fitting based at least on the calculated SSR;
    determine new parameters $\alpha$ based at least on the non-linear fitting; and
    determine new residuals based at least in part on the determined new parameters, $\alpha$;
    iteratively calculate, using the Levenberg-Marquardt method a minimum of a sum of squared residuals, SSR, to find the best fit geo-location of the target station based at least on the plurality of RTTs, $y_i$, appended location parameters, $x_i$, and initial location and moving parameters $\alpha$;
    perform an F-test to determine that the non-linear fitting using the best fit moving parameters is a better fit in terms of F-test, than the model using the stationary parameters, and,
    if true:
     proceed with the best fit moving parameters.
    if false:
     proceed with the best fit stationary parameters;
    determine new residuals based at least in part on the determined new parameters; and
    determine best fit parameters, $\alpha$, for calculation of a target location ellipse for the target station;
    calculate the target location ellipse for the target station; and
    determine the best fit geo-location of the target station based at least on the calculated target location ellipse.

The fitting of models to data when the equations are non-linear is a well-developed discipline used in diverse fields from physical sciences, to biology, to economics, to artificial intelligence and statistics in general. As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems, and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the model parameters used, the variables used, the initial parameters used, the velocity vectors, the timing between RTTs, the section of orbit used to determine changes in velocity. Accordingly, the scope should be determined not by the embodiments illustrated, but by their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device (WD) for determining a best-fit geo-location of a target station using a plurality of round-trip times (RTTs), each RTT being a time elapsed between a transmission of a ranging packet by the WD and a reception of a response packet by the WD, the target station being movable, the method comprising:
   assigning values to current target station parameters, the current target station parameters including a current location for the target station and movement parameters;
   determining a plurality of square residuals based at least in part on the current target station parameters, each square residual of the plurality of square residuals corresponding to one RTT, determining the plurality of square residuals including:
      determining a first group of residuals based on stationary parameters and a second group of residuals based on the movement parameters;
   for each of the first group and the second group of residuals:
      determining a model fit probability based at least in part on one of the determined first group of residuals and the determined second group of residuals;
      determining a sum of squared residuals (SSR);
      performing non-linear fitting based at least on the determined SSR;
      determining new parameters based at least on the non-linear fitting;
      determining new residuals based at least in part on the determined new parameters;
   determining a minimum of the SSR based at least on the plurality of square residuals;
   determining best-fit parameters based at least in part on the determined minimum of the SSR;
   performing an F-test to determine whether the non-linear fitting corresponding to moving parameters is a better fit than the non-linear fitting corresponding to the stationary parameters;
   if the non-linear fitting corresponding to the moving parameters is the better fit, using the non-linear fitting corresponding to the moving parameters to determine the best-fit geo-location; and
   if the non-linear fitting corresponding to the moving parameters is not the better fit and one of a first condition is met and a second condition is met, using the non-linear fitting corresponding to the stationary parameters to determine the best-fit geo-location, the first condition being met when a first difference between the SSR and a subsequent SSR is less than a predetermined minimum, the second condition being met when an absolute value of a second difference between a target station parameter and a subsequent target station parameter is less than the predetermined minimum; and
   determining the best-fit geo-location of the target station based at least on the best-fit parameters.

2. The method of claim 1, wherein performing non-linear fitting and determining new parameters are further based on a Levenberg-Marquardt process.

3. The method of claim 1, wherein the first group of residuals is defined by:

$$f(x_i, \alpha) = \alpha^{OFF} + \left(\frac{2}{c}\right) * d(x_i, \alpha).$$

Where $d(x_i, \alpha) = \left[(x_i^{LAT} - \alpha^{LAT})^2 + \right.$ $$\left. ((x_i^{LON} - \alpha^{LON}) * \cos(x_i^{LAT}))^2 + \left(\frac{x_i^{ALT} - \alpha^{ALT}}{CONVERSION}\right)^2 \right]^{\frac{1}{2}};$$

and
the second group of residuals is defined by:

$$f(x_i, \alpha) = \alpha^{OFF} + \left(\frac{2}{c}\right) * d(x_i, \alpha),$$

Where $d(x_i, \alpha) = \left[(x_i^{LAT} - (\alpha^{LAT} + \alpha^{VelNorth} * x_i^{TD}))^2 + \right.$ $$((x_i^{LON} - (\alpha^{LON} + \alpha^{VelEast} * x_i^{TD})) * \cos(x_i^{LAT}))^2 +$$

$$\left. \left(\frac{x_i^{ALT} - \alpha^{ALT}}{CONVERSION}\right)^2 \right]^{\frac{1}{2}},$$

$x_i$ represents WD location parameters,
$\alpha$ represents location parameters of the target station,
$x_i^{TD}$ is a negative time span of the corresponding RTT and a current time,
$\alpha^{VelEast}$ is in degrees latitude per time and is converted to a spherical coordinate by multiplying by $\cos(x_i^{LAT})$ before converting units, and
CONVERSION refers to conversion of altitude units to geographic distance units where speed of light is in units of geographic distance divided by units of RTT.

4. The method of claim 1, wherein the target station is moving, and the movement parameters include a first velocity vector in a first direction and a second velocity vector in a second direction.

5. The method of claim 1, the method further including:
   measuring the plurality of RTTs;
   appending WD location parameters to each RTT of the plurality of RTTs, the WD location parameters being associated with a location of the WD at a time of the reception of the response packet and being determined based in part on Global Positioning System (GPS) information;
   storing appended WD location parameters as records in a database; and
   when a preset period of time has elapsed and a number of stored records in a dataset exceeds a predetermined number, retrieving the stored records from the database to determine the plurality of square residuals.

6. The method of claim 1, the method further including:
   determining a target location ellipse for the target station based on the determined best-fit parameters; and
   performing the determination of the best-fit geo location of the target station further based on the determined target location ellipse.

7. The method of claim 6, the method further including:
   determining at least one of a Jacobian matrix, a Hessian sum, and a correlation matrix to determine the target location ellipse.

8. A wireless device (WD) for determining a geo-location of a target station using round-trip times (RTTs) of a plurality of signals transmitted by the WD to the target station, and response signals received from the target station corresponding to the transmitted signals, the WD comprising processing circuitry configured to:
   assign values to current target station parameters, the current target station parameters including a current location for the target station and movement parameters;
   determine a plurality of square residuals based at least in part on the current target station parameters, each square residual of the plurality of square residuals corresponding to one RTT, determining the plurality of square residuals including:
      determining a first group of residuals based on stationary parameters and a second group of residuals based on the movement parameters;
      for each of the first group and the second group of residuals:
         determining a model fit probability based at least in part on one of the determined first group of residuals and the determined second group of residuals;
         determining a sum of squared residuals (SSR);
         performing non-linear fitting based at least on the determined SSR;
         determining new parameters based at least on the non-linear fitting;
         determining new residuals based at least in part on the determined new parameters;
   determine a minimum of the SSR based at least on the plurality of square residuals;
   determine best-fit parameters based at least in part on the determined minimum of the SSR;
   perform an F-test to determine whether the non-linear fitting corresponding to moving parameters is a better fit than the non-linear fitting corresponding to the stationary parameters;
   if the non-linear fitting corresponding to the moving parameters is the better fit, use the non-linear fitting corresponding to the moving parameters to determine the best-fit geo-location; and
   if the non-linear fitting corresponding to the moving parameters is not the better fit and one of a first condition is met and a second condition is met, use the non-linear fitting corresponding to the stationary parameters to determine the best-fit geo-location, the first condition being met when a first difference between the SSR and a subsequent SSR is less than a predetermined minimum, the second condition being met when an absolute value of a second difference between a target station parameter and a subsequent target station parameter is less than the predetermined minimum; and
   determine the best-fit geo-location of the target station based at least on the best-fit parameters.

9. The WD of claim 8, wherein performing non-linear fitting and determining new parameters are further based on a Levenberg-Marquardt process.

10. The WD of claim 8, wherein the first group of residuals is defined by:

$$f(x_i, \alpha) = \alpha^{OFF} + \left(\frac{2}{c}\right) * d(x_i, \alpha).$$

Where $d(x_i, \alpha) = \left[(x_i^{LAT} - \alpha^{LAT})^2 + \right.$ $$\left. ((x_i^{LON} - \alpha^{LON}) * \cos(x_i^{LAT}))^2 + \left(\frac{x_i^{ALT} - \alpha^{ALT}}{CONVERSION}\right)^2\right]^{\frac{1}{2}};$$

and
the second group of residuals is defined by:

$$f(x_i, \alpha) = \alpha^{OFF} + \left(\frac{2}{c}\right) * d(x_i, \alpha),$$

Where $d(x_i, \alpha) = \left[(x_i^{LAT} - (\alpha^{LAT} + \alpha^{VelNorth} * x_i^{TD}))^2 + \right.$ $$((x_i^{LON} - (\alpha^{LON} + \alpha^{VelEast} * x_i^{TD})) * \cos(x_i^{LAT}))^2 +$$

$$\left.\left(\frac{x_i^{ALT} - \alpha^{ALT}}{CONVERSION}\right)^2\right]^{\frac{1}{2}},$$

$x_i$ represents WD location parameters,
$\alpha$ represents location parameters of the target station,
$x_i^{TD}$ is a negative time span of the corresponding RTT and a current time,
$\alpha^{VelEast}$ is in degrees latitude per time and is converted to a spherical coordinate by multiplying by $\cos(x_i^{LAT})$ before converting units, and
CONVERSION refers to conversion of altitude units to geographic distance units where speed of light is in units of geographic distance divided by units of RTT.

11. The WD of claim 8, wherein the target station is moving, and the movement parameters include a first velocity vector in a first direction and a second velocity vector in a second direction.

12. The WD of claim 8, wherein the WD further comprises a transmitter receiver in communication with the processing circuitry, the transmitter receiver being configured to:
   measure the plurality of RTTs;
   the processing circuitry being further configured to:
      append WD location parameters to each RTT of the plurality of RTTs, the WD location parameters being associated with a location of the WD at a time of the reception of the response packet and being determined based in part on Global Positioning System (GPS) information;

store appended WD location parameters as records in a database; and when a preset period of time has elapsed and a number of stored records in a dataset exceeds a predetermined number, retrieve the stored records from the database to determine the plurality of square residuals.

13. The WD of claim 8, wherein the processing circuitry is further configured to:

determine a target location ellipse for the target station based on the determined best-fit parameters; and perform the determination of the best-fit geo location of the target station further based on the determined target location ellipse.

14. The WD of claim 13, wherein the processing circuitry is further configured to:

determine at least one of a Jacobian matrix, a Hessian sum, and a correlation matrix to determine the target location ellipse.

15. A measuring station for determining a best-fit geo-location of a target station using a plurality of round-trip times (RTTs), each RTT being a time elapsed between a transmission of a ranging packet by the measuring station and a reception of a response packet by the measuring station, the measuring station comprising:

a wireless device comprising:

a transmitter receiver configured to:

measure the plurality of RTTs; and processing circuitry in communication with the transmitter receiver, the processing circuitry being configured to:

assign values to current target station parameters, the current target station parameters including a current location for the target station and movement parameters;

determine a plurality of square residuals based at least in part on the current target station parameters, each square residual of the plurality of square residuals corresponding to one RTT, determining the plurality of square residuals including:

determining a first group of residuals based on stationary parameters and a second group of residuals based on the movement parameters;

for each of the first group and the second group of residuals:

determining a model fit probability based at least in part on one of the determined first group of residuals and the determined second group of residuals;

determining the SSR;

performing non-linear fitting based at least on the determined SSR;

determining new parameters based at least on the non-linear fitting; and determining new residuals based at least in part on the determined new parameters;

determine a minimum of a sum of squared residuals (SSR) based at least on the plurality of square residuals;

determine best-fit parameters based at least in part on the determined minimum of the SSR;

perform an F-test to determine whether the non-linear fitting corresponding to moving parameters is a better fit than the non-linear fitting corresponding to the stationary parameters;

if the non-linear fitting corresponding to the moving parameters is the better fit, use the non-linear fitting corresponding to the moving parameters to determine the best-fit geo-location; and if the non-linear fitting corresponding to the moving parameters is not the better fit and one of a first condition is met and a second condition is met, use the non-linear fitting corresponding to the stationary parameters to determine the best-fit geo-location, the first condition being met when a first difference between an SSR and a subsequent SSR is less than a predetermined minimum, the second condition being met when an absolute value of a second difference between a target station parameter and a subsequent target station parameter is less than the predetermined minimum; and determine the best-fit geo-location of the target station based at least on the best-fit parameters.

\* \* \* \* \*